United States Patent [19]

Lush

[11] 4,152,902
[45] May 8, 1979

[54] CONTROL FOR REFRIGERATION COMPRESSORS

[76] Inventor: Lawrence E. Lush, P.O. Box 1704, Crestline, Calif. 92325

[21] Appl. No.: 799,341

[22] Filed: May 23, 1977

Related U.S. Application Data

[63] Continuation-in-part of Ser. No. 652,296, Jan. 26, 1976, abandoned.

[51] Int. Cl.² ............................................. F25B 5/00
[52] U.S. Cl. ........................................ 62/157; 62/175; 236/1 E; 318/98; 417/7
[58] Field of Search ............. 236/1 E; 62/196 A, 228, 62/175, 510, 157; 361/22; 318/98; 417/6–8; 307/39

[56] References Cited

U.S. PATENT DOCUMENTS

| | | | |
|---|---|---|---|
| 2,803,192 | 8/1957 | Crabtree | 417/7 |
| 3,229,639 | 1/1966 | Highnutt et al. | 417/7 X |
| 3,513,662 | 5/1970 | Golber | 62/175 X |
| 3,744,932 | 7/1973 | Prevett | 417/7 X |
| 3,780,053 | 12/1973 | Norbeck et al. | 62/228 X |

*Primary Examiner*—William E. Wayner
*Attorney, Agent, or Firm*—George H. Gerstman

[57] ABSTRACT

A device for controlling a single variable capacity compressor, or multiple variable capacity compressors in either parallel flow or series flow chilling systems, senses temperature and load conditions and uses feedback in conjunction with synchronously and asynchronously timed logic circuitry to automatically control loading, unloading and sequencing of the compressor or compressors in the system in selected increments, thereby yielding a significant reduction in energy consumption as well as increased precision in maintaining a desired chill temperature. Additional circuitry provides for remote manual control as well as safety shut-off and failure indication. Alternative embodiments using solid state logic, including a microprocessor embodiment, are also disclosed.

36 Claims, 15 Drawing Figures

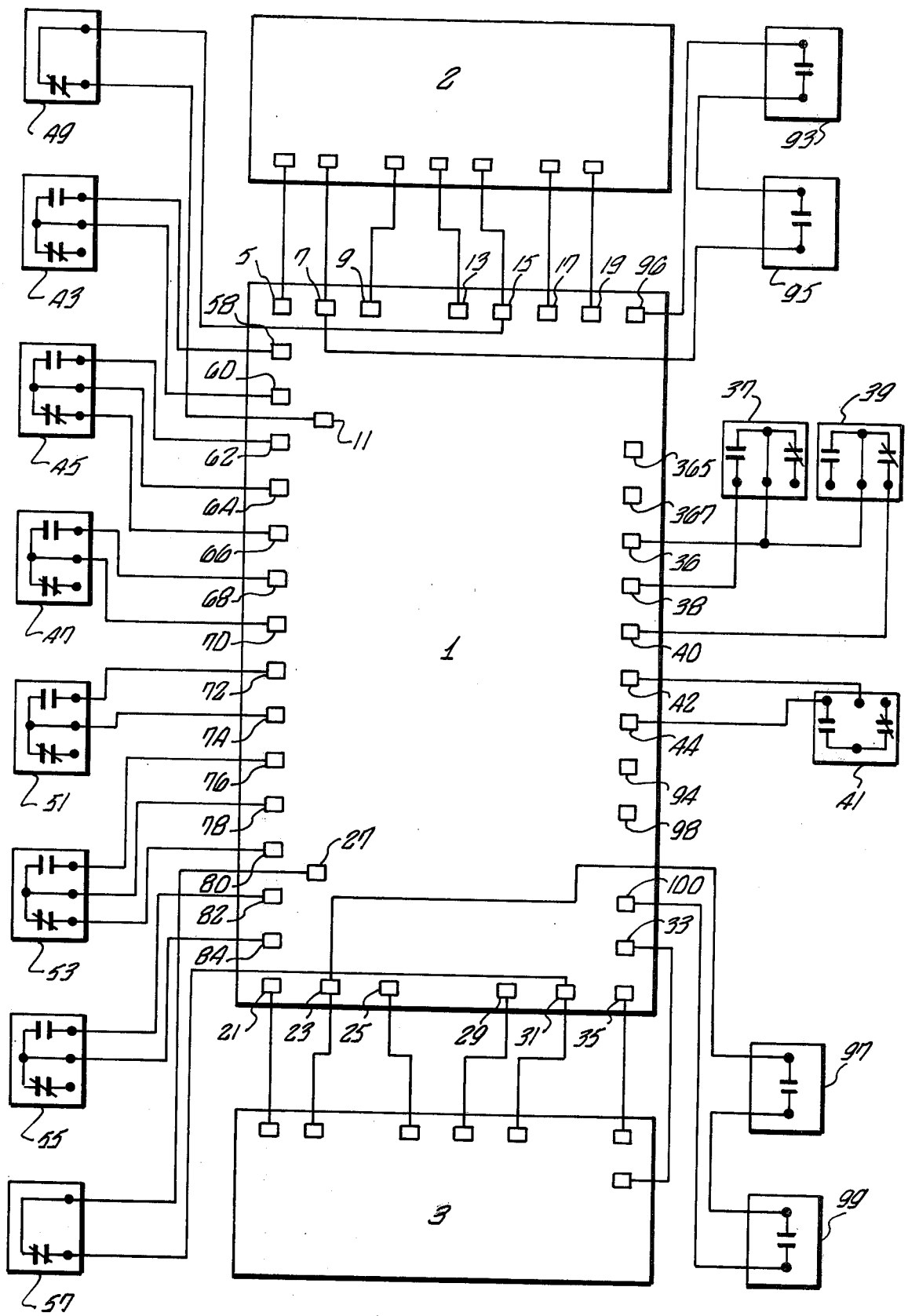

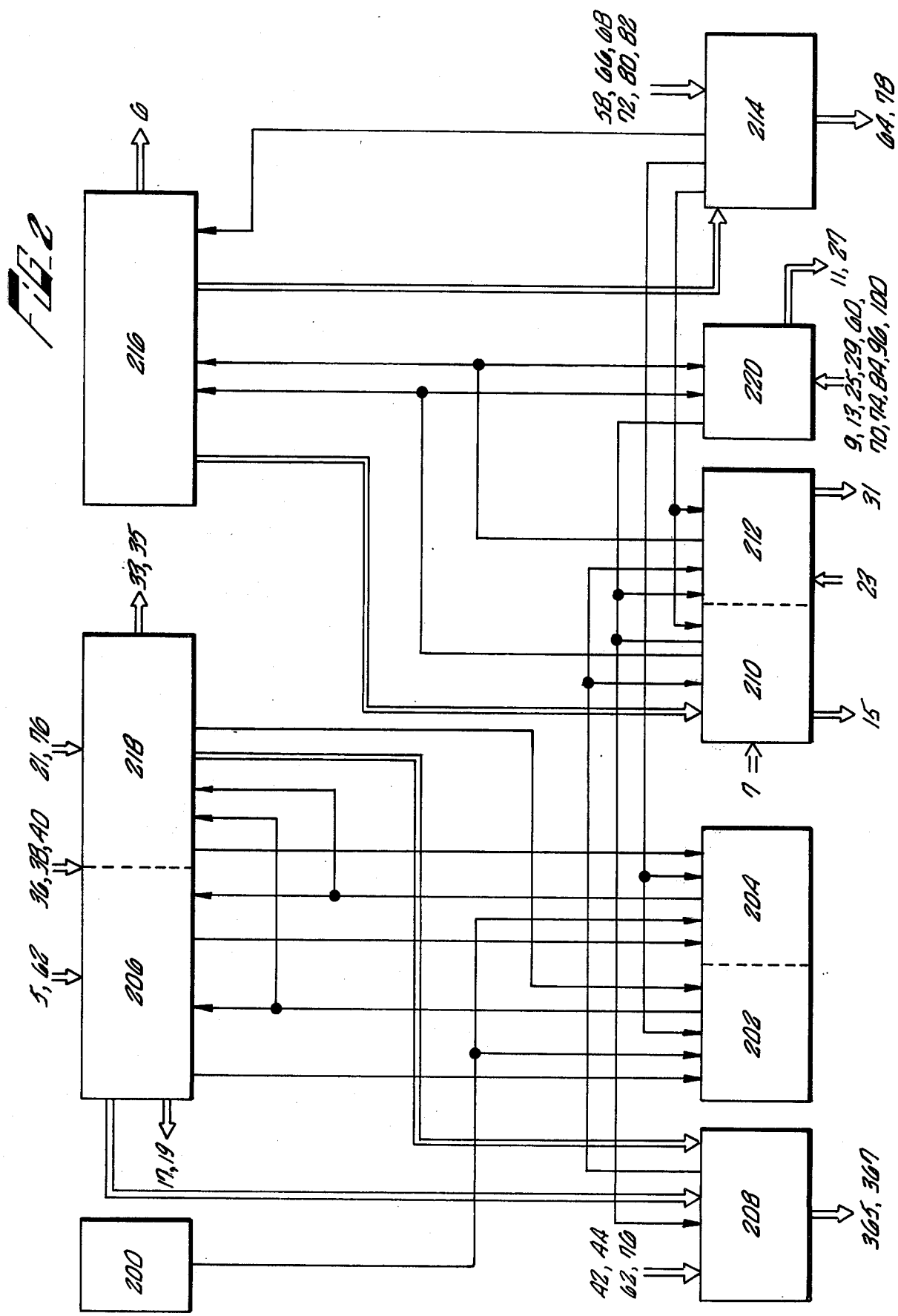

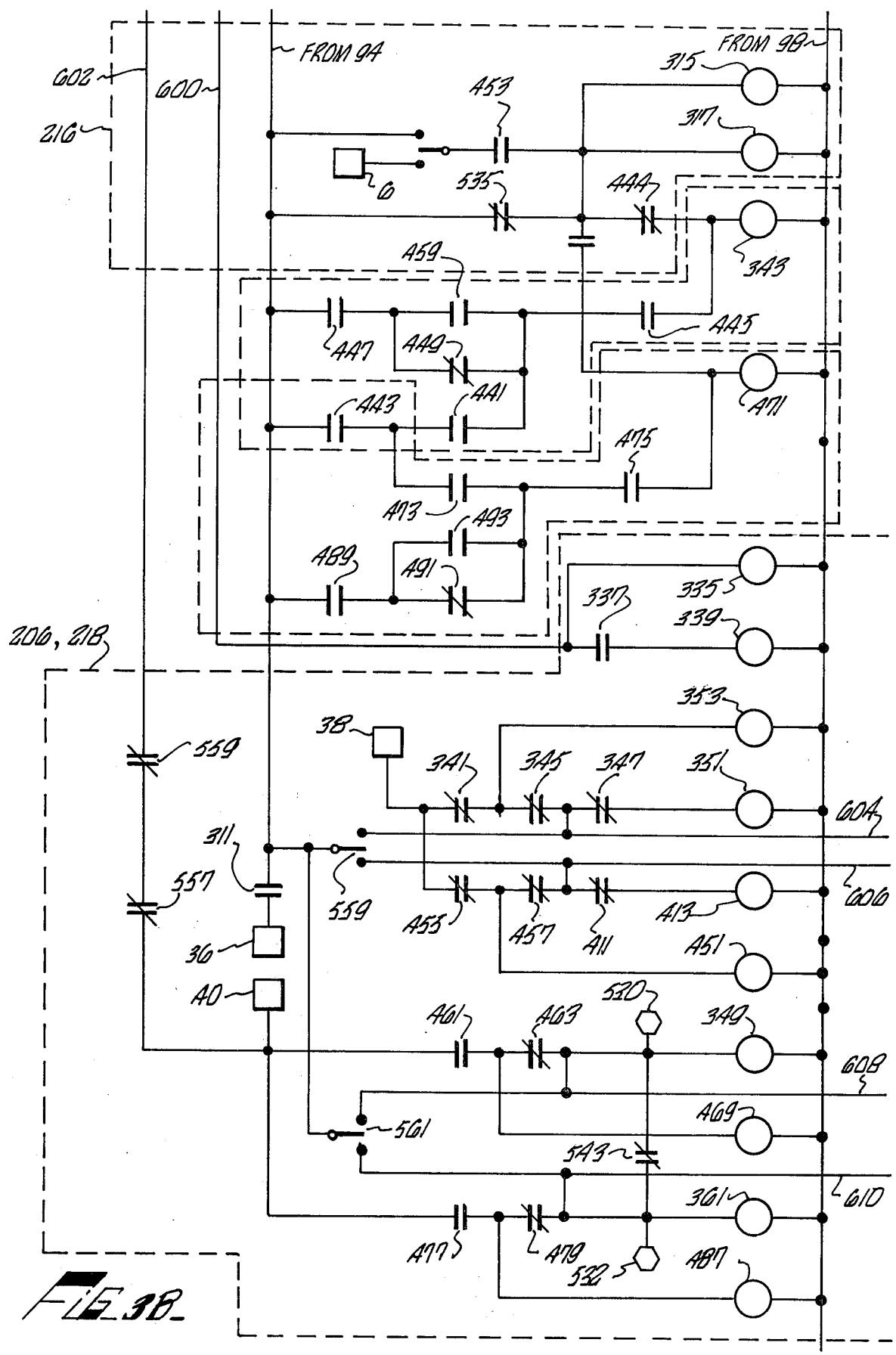

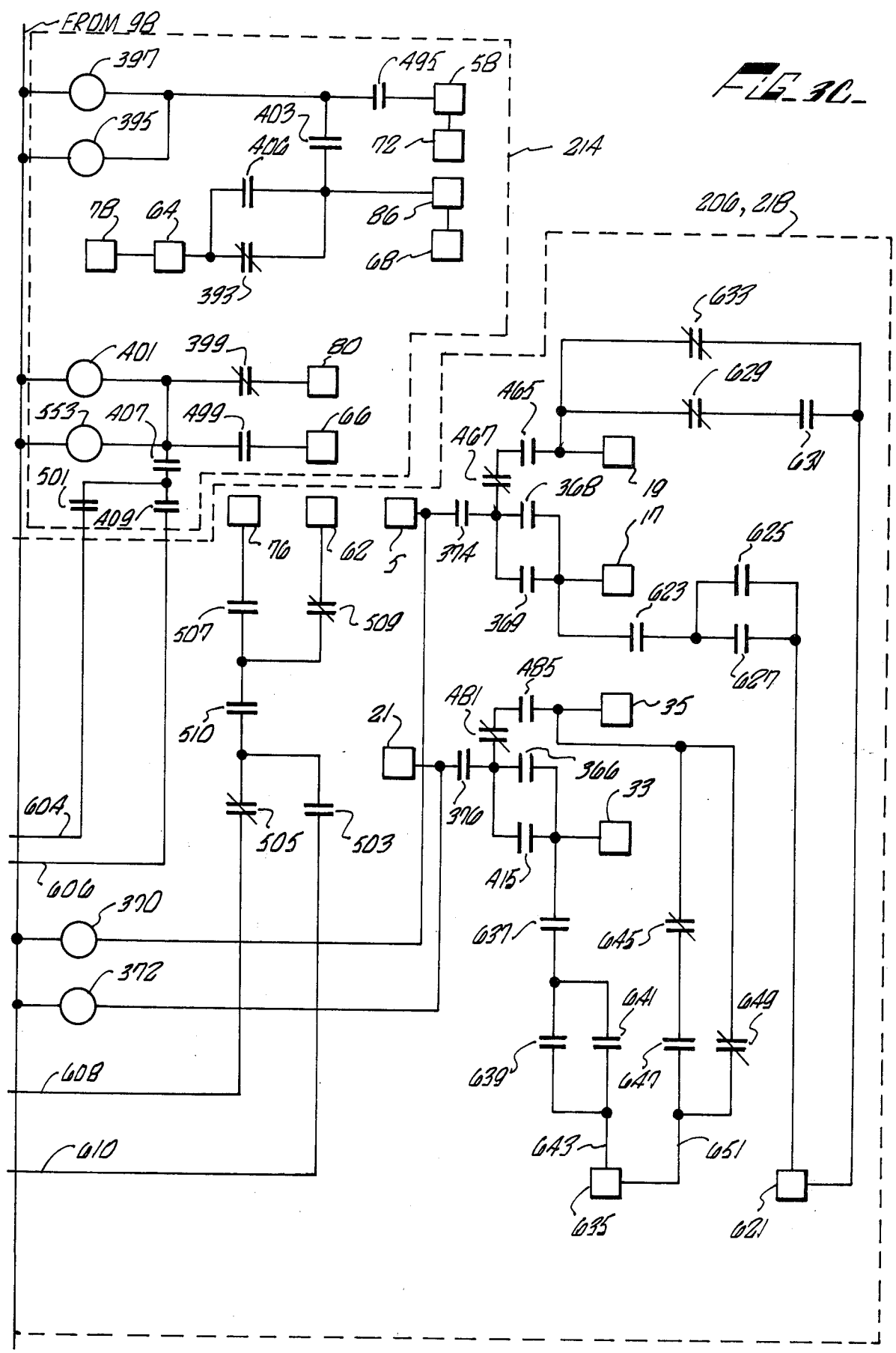

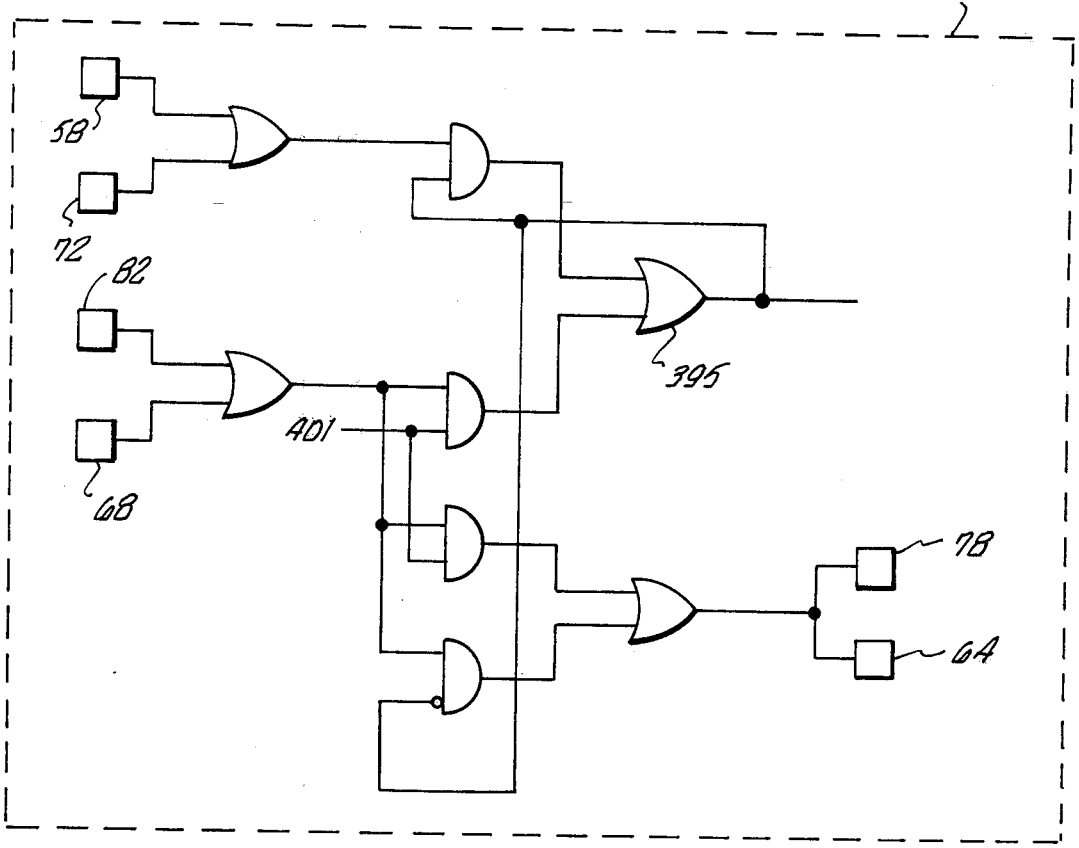
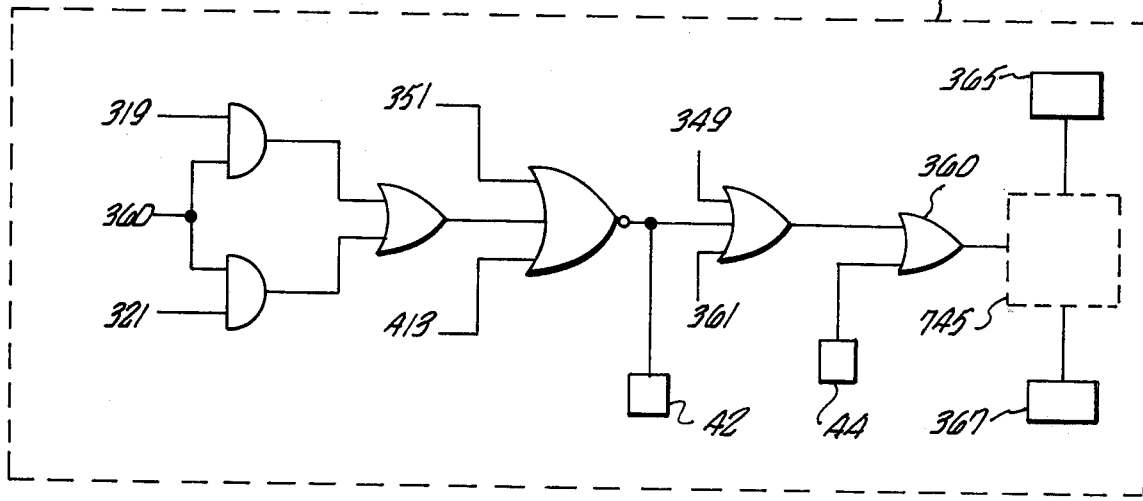
FIG. 4A.

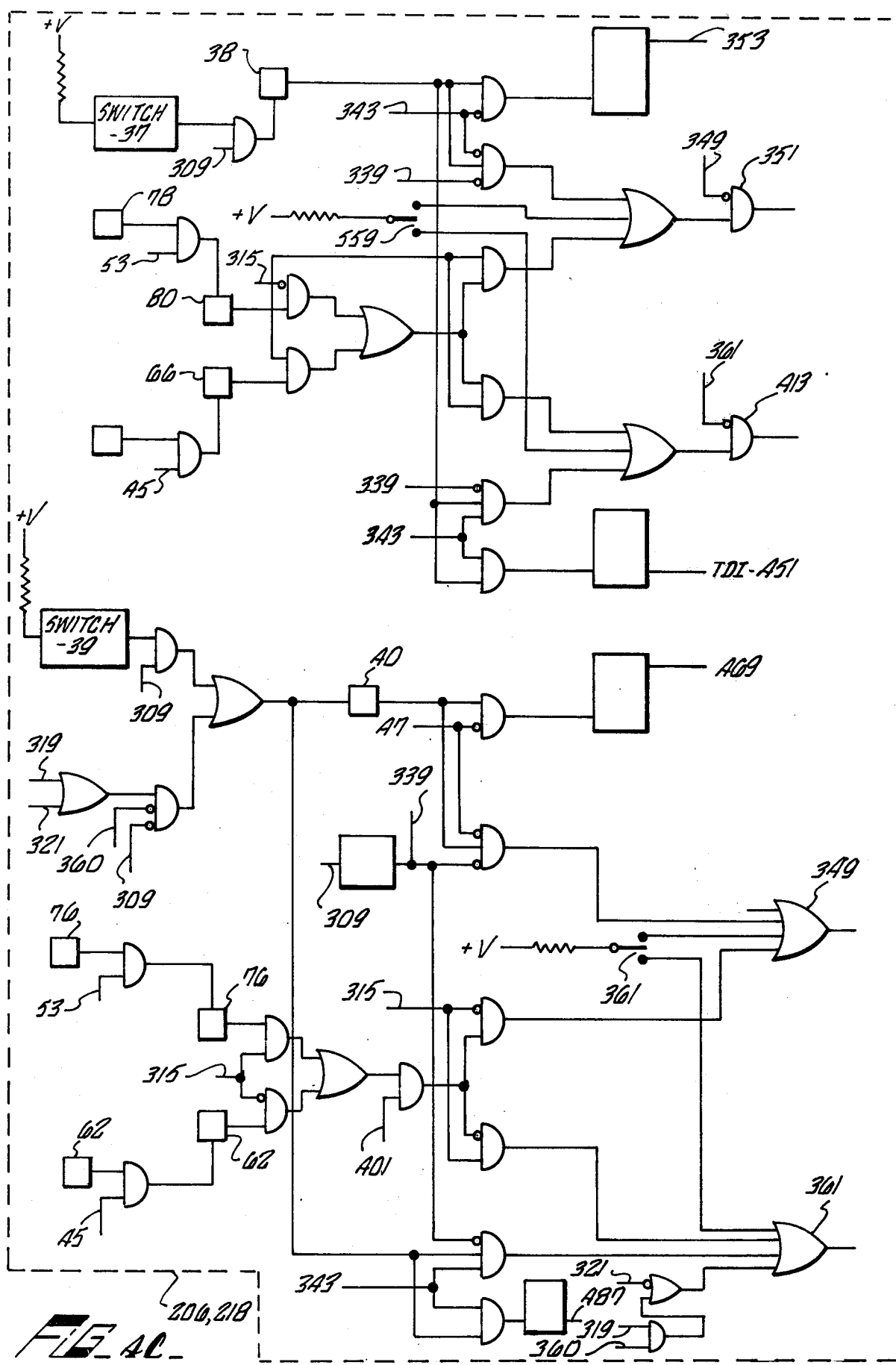

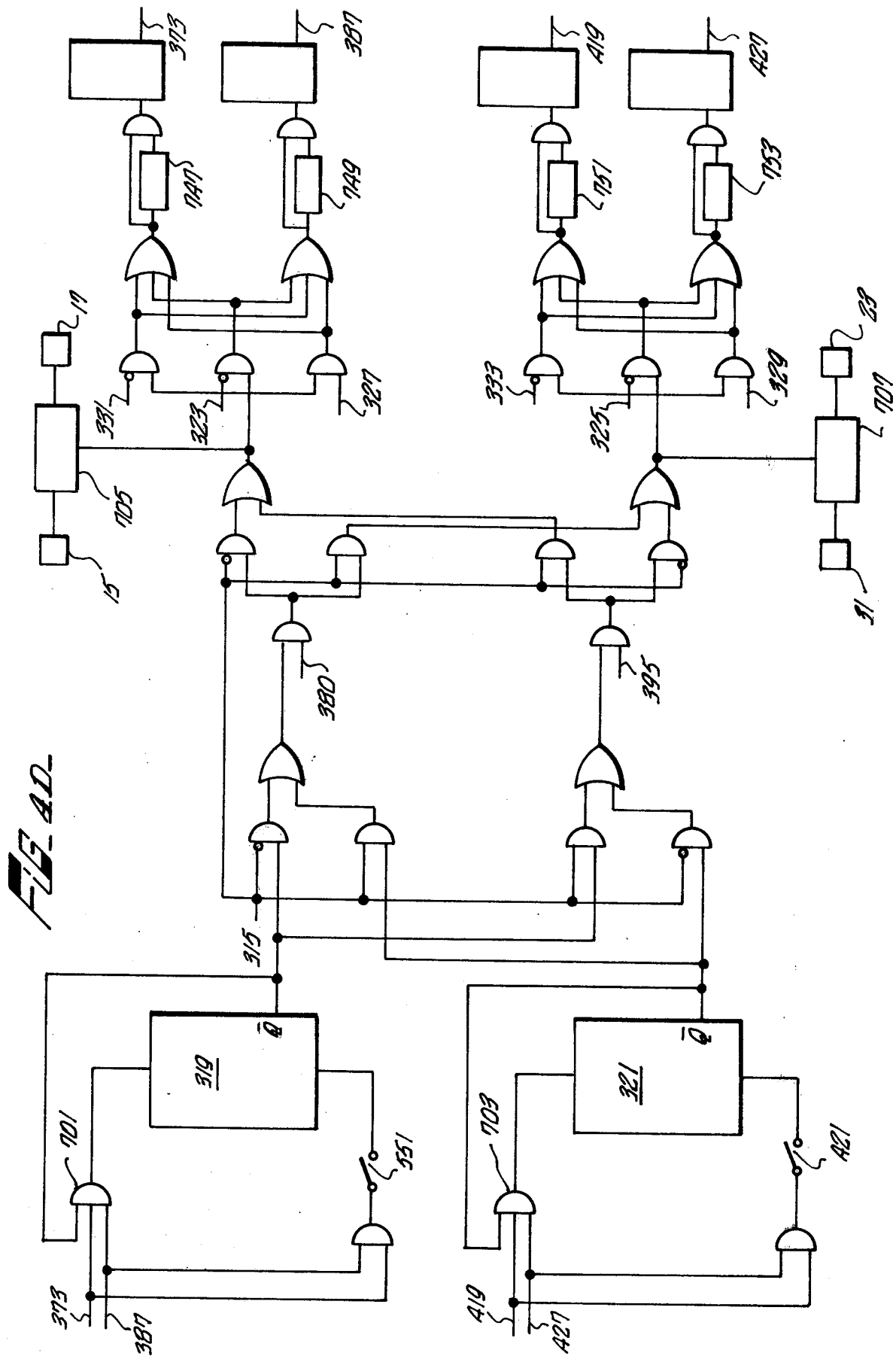

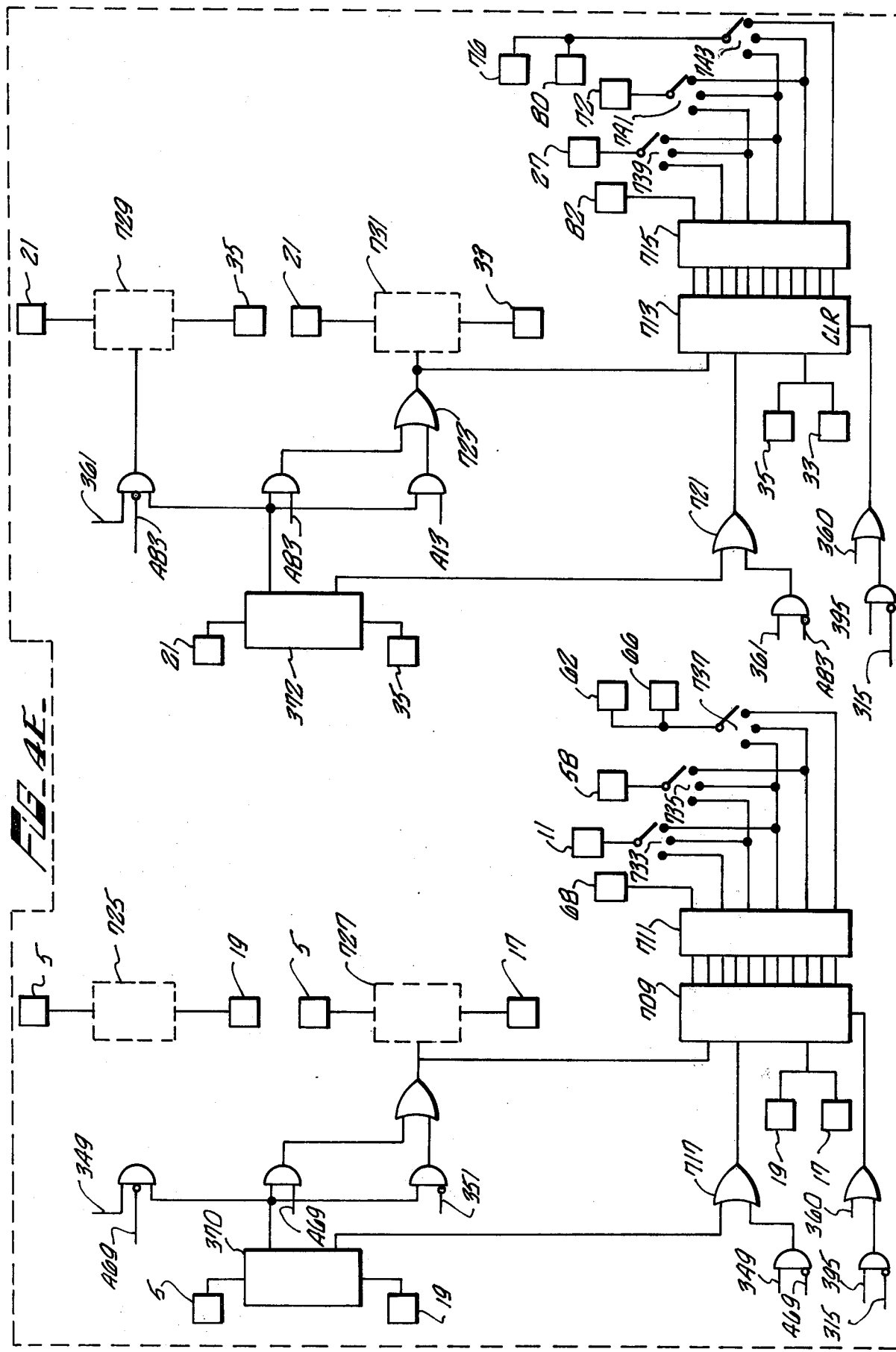

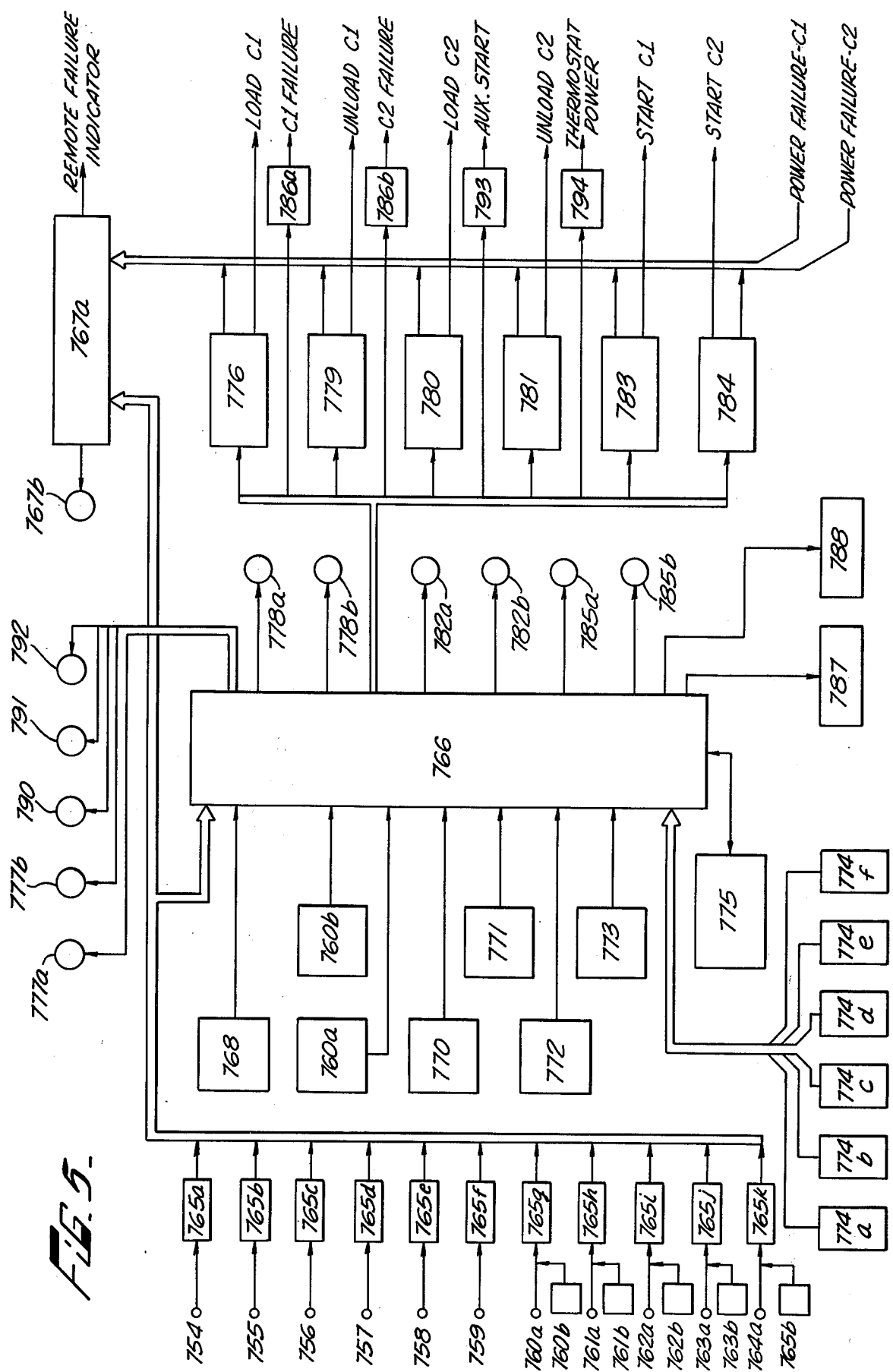

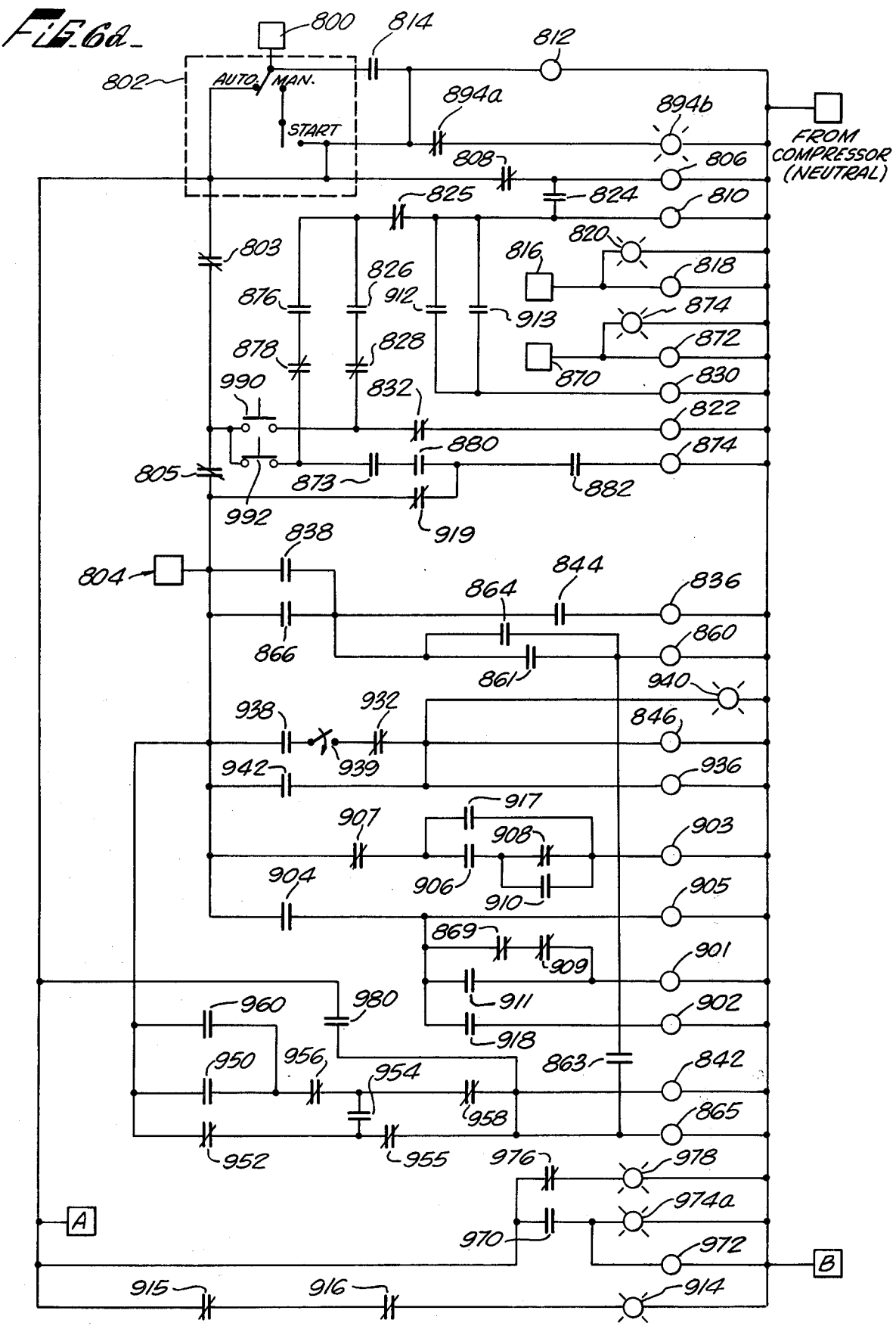

CONTROL FOR REFRIGERATION COMPRESSORS

This application is a continuation in part of U.S. patent application Ser. No. 652,296, filed Jan. 26, 1976, now abandoned.

BACKGROUND OF THE INVENTION

Refrigeration systems, as for air conditioning in large buildings, typically employ multiple compressors in either parallel or series flow for chilling of a controlled medium such as process water, cold plenum, chill water or return water. In many such systems the chilling capacity of the compressor may be varied. Some systems do not require the chilling capacity of a multiple compressor system, and use only a single, variable capacity compressor. Each such compressor, for example the York Model HT 250 with electrical control, typically has internal controls and safety devices which provide for failure shutdown and overload protections. However, such internal controls are effective only in controlling the individual compressor and thus have limited value in a multiple compressor system. Further, the internal controls do not react automatically to changes in the demand for chilling capacity, and are thus of limited value in even single compressor systems.

Because of the substantial power demands of such refrigeration systems, especially in view of the rising cost of energy, and the inconvenience resulting from system failures, it is important not only that a compressor system be kept operating, but that the system operate efficiently. Toward this end, various forms of control devices have been employed to turn on or turn off and increase or decrease chilling capacities of the individual variable capacity compressors within the system. For screw-type compressors, capacity is varied by the relative position of the coolant inlet nozzle. For centrifugal compressors, capacity is varied by varying vane position. However, capacity need not in all cases vary directly with vane position. Nevertheless, for purposes of simplicity capacity and vane position are used herein as being substantially interchangeable.

Certain of these prior art control devices have suffered from overloading proglems on initial startup, raising the possibility of nuisance failures—i.e., a shutdown of the system when actually no system failure exists. For example, on initial startup many control devices permit the system compressors to increase to maximum capacity over a short time period, thereby causing such nuisance failures as low refrigerant temperature shutdown, or overshoot on water temperature control, when actually no system failure exists. Such a rapid increase in capacity also results in a large short term increase in power consumption. A similar problem occurs when a first compressor is at maximum capacity and demand requires the additional chilling capacity of another system compressor, resulting in increased power consumption for an extended period of time on startup of the second compressor.

One solution to this problem used with reciprocal compressors has been to periodically sense a thermostat and to permit the capacity of the compressor to vary by only limited amounts each time the thermostat is sensed. Other prior art control devices have attempted to avoid these sorts of nuisance failures by a circuit commonly referred to as a "load limiter", which essentially senses the load current of the compressor and compares that current to a known maximum value. The control device then allows only a percentage increase in load current during a given period.

The difficulty with the load limiter type of control device is especially apparent in variable capacity centrifugal compressors, in either multiple or single compressor systems. In centrifugal compressors load current increases are not necessarily indicative of variations in compressor capacity. For example, when a small amount of material of a viscosity different from the state of the normal refrigerant is accidentally drawn into the compressor, load current will increase without varying the capacity. This can cause a current "spike" in the load limiter circuit, which in turn causes the load limiter control to improperly reduce capacity.

Another problem found in conventional control devices has been a difficulty in maintaining a balance in capacities of the system compressors. Most multiple compressor systems employ compressors of equal capacity. To maximize the operating efficiency of such a system, thereby minimizing power demand, it is desirable to equalize, or balance, the capacity of each machine at any given moment during operation. For systems employing compressors of differnt capacities, a weighted balance is desirable.

This balancing requires two steps: first, that the capacities of the operating compressors be initially balanced; and, second, that increases or decreases in capacity be distributed between the operating compressors so as to substantially maintain a balance in chilling capacities. The distribution of increases or decreases may be accomplished either by signalling both compressors to load or unload a given amount, or by alternating the loading (or unloading) of the compressors. Typically, the latter option is chosen to minimize enery demand; however, accurate sensing of compressor capacity, coupled with an efficient alternating control has proven difficult.

In single compressor systems, accurate control has also proven difficult. In addition to the problems previously discussed, most prior art control systems can provide only a few incremental changes in chilling capacity, such that gross changes in demand are required before the control device will respond with a variation in capacity.

SUMMARY OF THE INVENTION

In accordance with the present invention, a control device senses the temperature of the controlled medium by means of any temperature sensing device which provides a floating control signal and, during an appropriate timing cycle, delivers commands to a lead compressor or a lag compressor, typically variable capacity centrifugal or screw compressors, to adjust chilling capacity in accordance with the demand indicated by the temperature of the controlled medium. Of course, in a single compressor system, signals will always be delivered to that compressor. Because centrifugal compressors are generally more difficult than screw compressors to accurately control, the present disclosure is directed to centrifugal compressors. However, conversion of the present system for use on screw-type compressors will be apparent to those skilled in the art.

During a typical cycle for either a single or multiple compressor system, initial application of power is followed by an indication that additional chilling capacity is required. In typical prior art, as noted previously, such a demand is met by increasing compressor capacity to some maximum load, for example 100% capacity. This rapid increase results in an unnecessary surge in capacity and, correspondingly, power consumption. In accordance with the present invention, however, a cycle timer permits only an incremental increase in capacity (the magnitude of the increase being preset) during a portion of each cycle. The remainder of the cycle permits the controlled medium to react to the change in chilling capacity. If, at the beginning of the next cycle, additional chilling capacity is required, another incremental increase in compressor capacity is permitted followed by the reaction time mentioned above. The incremental increases continue until the controlled medium stabilizes at the desired temperature. By permitting only incremental increases, power surges are avoided, thus eliminating a large source of nuisance failures and significantly reducing power consumption.

For multiple compressor systems, in some situations a single (lead) compressor will be unable to satisfy demand for increased chilling. In such cases, the present invention automatically directs, independently of cycle timing, that the capacity of the lead compressor be decreased to some arbitrary value and that a second, or lag, compressor be started and brought to an arbitrary chilling capacity. Typically, the sum of capacities of both (or multiple) compressors is less than the maximum capacity of a single compressor, due to the heightened efficiency associated with increased surface area. By automatically reducing the capacity of the lead compressor prior to starting the lag compressor, increased power consumption is reduced.

Once the lead and lag compressors have reached their respective capacities, cycle timing is permitted to direct the incremental loading or unloadin of the system. Thereafter, should a demand for increased chilling be received during the "on" portion of the timer cycle, the incremental increases in capacity will be alternately directed to the lead and lag compressors. Because of the new configuration for alternating the signals varying compressor capacity, the present invention more efficiently and accurately maintains an operating balance among system compressors.

If chilling capacity exceeds demand, capacity is incrementally decreased in a manner similar to that described above. If demand drops below that necessary to efficiently utilize more than one compressor, the lag compressor is stopped, leaving only the lead compressor operating. The multiple compressor system then operates in a manner substantially similar to a single compressor, with all incremental increase or decrease signals being directed to a single compressor. The capacity of the lead compressor is then incrementally increased or decreased to satisfy demand. If demand decreases sufficiently the lead compressor is also stopped automatically.

Other aspects of the present invention provide for detection and indication of compressor failures, with automatic load shifting to the remaining compressors, as well as local or remote manual control to override automatic sequencing.

It is one object of this invention to provide an improved system for the control of refrigeration compressors.

It is one object of this invention to provide an improved refrigeration system control device for controlling multiple compressors from a single location.

It is a further object of this device to provide an improved refrigeration system control device which significantly reduces power consumption by the refrigeration system.

It is a further object of this invention to provide a refrigeration system control device with improved accuracy in maintaining the temperature of a controlled medium at a desired level.

It is a further object of this invention to provide a refrigeration system control device which substantially eliminates excessive power consumption on compressor start-up.

It is a further object of this invention to provide an improved refrigeration system control device which does not override the internal safeguards.

Other and further objects of the invention disclosed herein will become apparent in the course of the following detailed description.

IN THE DRAWINGS

FIG. 1 illustrates the control device in a refrigeration system utilizing two compressors.

FIG. 2 diagrammatically illustrates in block diagram form the control device of FIG. 1, and the interconnections therebetween.

FIGS. 3a-3d show a schematic diagram of the control device of FIGS. 1 and 2 using relays.

FIG. 3 show the interrelationship between FIGS. 3a-3d.

FIGS. 4a-4e illustrates a logic gate equivalent of the control device of FIGS. 3a and 3d.

FIG. 5 shows a functional block diagram of the system of FIG. 2, suitable for implementation with a microprocessor and associated circuitry.

Figure 6B:
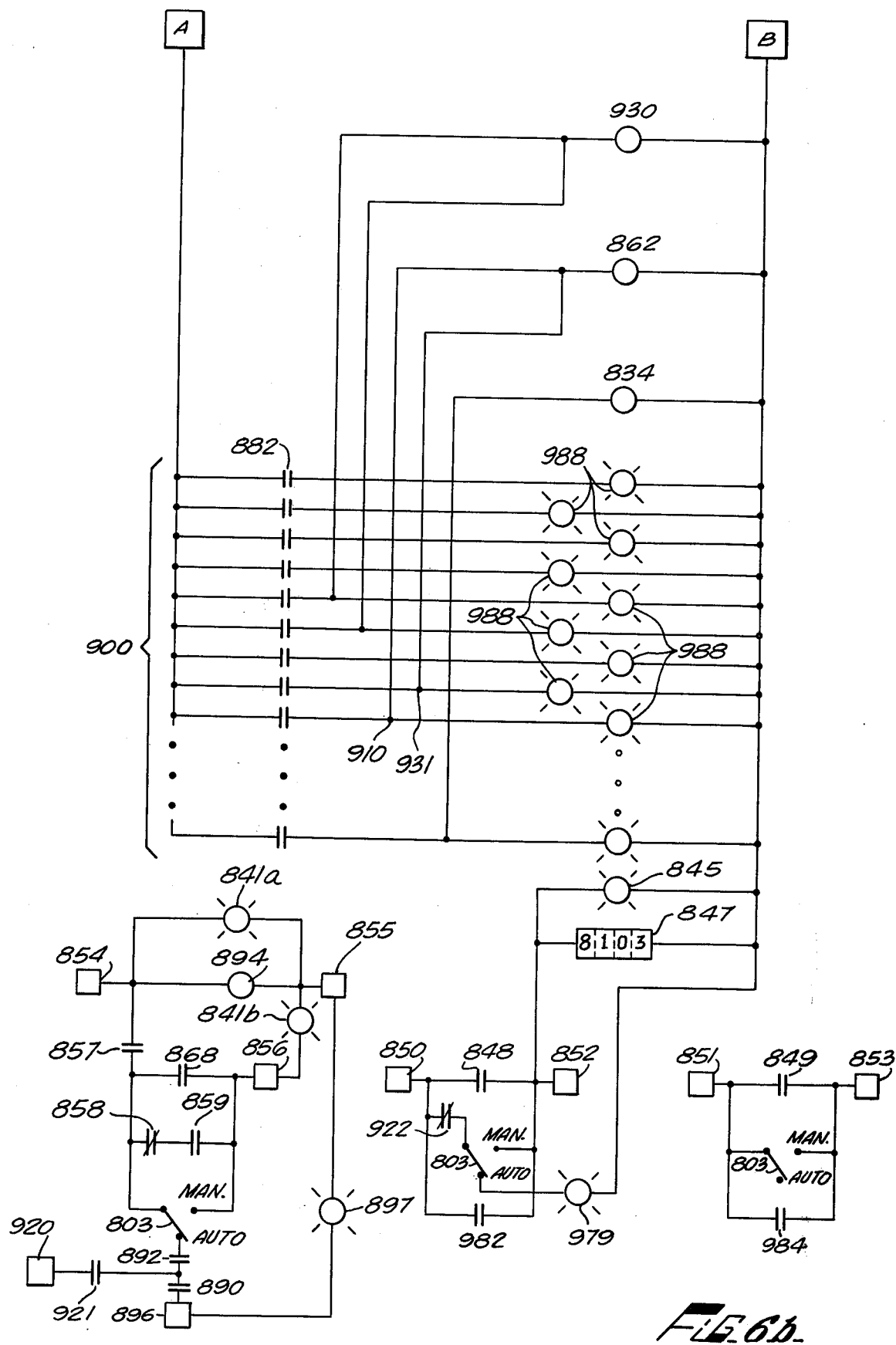

FIGS. 6a-b show a circuit diagram of a control device for use with a single compressor system.

DESCRIPTION OF THE PREFERRED EMBODIMENTS

Attention is now directed to FIG. 1, which illustrates a control device 1 interconnected with a first compressor 2 and a second compressor 3. The first compressor 2 is connected to the control device 1 at terminals 5, 7, 9, 13, 15, 17 and 19, which communicate present vane inclination, system on, compressor oil failure, compressor safety failure, compressor start, increase vane inclination and decrease vane inclination signals respectively. The second compressor 3 is connected to the control device 1 at terminals 21, 23, 25, 29, 31, 33 and 35 in an analogous manner; that is, the the function communicated at terminal 21 corresponds to the function communicated at terminal 5, and so on such that the functions communicated at terminals 19 and 35 correspond.

Also connected to control device 1 are temperature control switches 37, connected between terminals 36 and 38, and 39, connected between terminals 36 and 40, which indicate a required increase or decrease in chilling respectively. Switches 37 and 39 are typically controlled by a termostat which may, for example, be placed in the chilled water return line. Further, low temperature shutdown switch 41 is connected to control device 1 at terminals 42 and 44. Switch 41 functions to shut down lead compressor when demand for chilling falls below some predetermined value; however, once chilling demand has been established in the controlled space, the temperature of the controlled medium seldom falls low enough to activate low temperature shutdown switch 41. Also a part of control device 1 for use in controlling the first compressor 2 is four vane indication switches 43, 45, 47 and 49. Normally open vane switch 43, connected to the control device 1 at terminals 58 and 60, is used to indicate some minimum capacity of the compressor 2, so as to permit shut-down in a manner discussed in detail hereinafter when compressor 2 is not needed for adequate chilling. Vane indication switch 45, connected at terminals 62, 64, and 66, provides both normally open and normally closed contacts and is used in a manner discussed later to indicate a return condition when a lag compressor is being started up. Normally open vane indication switch 47, connected at terminals 68 and 70, is used to indicate a maximum capacity of the compressor 2, so as to permit a second compressor to be called into operation upon increased demand for chilling. Normally closed minimum vane indication switch 49, connected at terminals 11 and 15, is used to position the vanes at some arbitrarily determined minimum capacity, for example twenty percent, immediately after the compressor starts so as to maximize the efficiency of compressor operation. Switches 51, 53, 55 and 57 are connected to the control device 1 for use with second compressor 3. Switch 51 is connected at terminals 72 and 74 and is analogous to switch 43; switch 53 is connected at terminals 76, 78 and 80 and is analogous to switch 45. Switch 55 is connected at terminals 82 and 84 and is analogous to switch 47; switch 57 is connected at terminals 27 and 31 and is analogous to switch 49.

For proper operation of the control device 1, it is necessary that vane switches 49 and 57 be set for a lesser vane position than switches 43 and 51; for eample, 20% and 25%, respectively, of maximum vane position. Further, vane switches 45 and 53 must be set for a greater vane position than switches 43 and 51, for example 30%. Vane switches 47 and 55 are typically set on the order of 85% of maximum vane angle, but must be set for a vane position which causes switches 47 and 55 to operate before the overload protection devices internal to the compressor are triggered.

Also connected to control device 1 are flow switches 93, 95, 97 and 99. Flow switches 93 and 95 are safety switches to insure chill water flow through first compressor 2, and are series connected to the control device 1 at terminals 7 and 96. Flow switches 97 and 99 are analogous but intended for use with second compressor 3 and are connected to the control device 1 at terminals 223 and 100.

Attention is now directed to FIG. 2, which illustrates in block diagram form the internal circuitry of the control device 1 as shown in FIG. 1. In FIG. 2, a timer 200 operates synchronously and independently of the remaining circuit elements, and communicates a timing signal to an R3 transfer circuit 202, an R4 transfer circuit 204, a first compressor load and unload circuit 206 and a second compressor load and unload circuit 218. During a portion of the timing cycle generated by the timer 200, the first compressor load and unload circuit 206 is permitted to accept a signal from the temperature control switches 37 and 39, shown in FIG. 1 through terminals 36, 38 and 40. If an increase in chilling capacity is needed, normally open switch 37 will be closed. Should neither the first compressor 2 nor the second compressor 3 be in operation—that is, should the system require initial start-up as it would, for example, early in the morning—load and unload circuitry 206 responds to the demand for increased chilling capacity by signaling the first compressor 2 via terminal 17 to increase vane inclination. The load circuit 206 at the same time signals a pump start circuit 208 to complete a circuit between terminals 365 and 367 of the control device 1, thereby starting the system pump (not shown). In some systems, more than one pump is used, as one pump per compressor. In such systems the pump may be started from a compressor start signal. When the pump start circuit 208 responds to the load circuit 206, it in turn also signals the lead compressor to start through compressor start circuit 210 or 212. Whether first compressor 2 or second compressor 3 is assigned as the lead compressor is determined automatically by sequence circuit 216 in a manner described hereinafter. For purposes of example, let it be assumed that first compressor 2 is the lead compressor, whereupon first compressor start circuit 210 signals, via terminal 15, the first compressor 2 to begin operation, which will thereafter be permitted to occur in a manner described in greater detail in connection with FIG. 3a.

At this point the system pump and a lead compressor have been started, and chilling has begun. Assuming that the initial chilling capacity of the single lead compressor is insufficient to satisfy demand, as manifested by normally open switch 37 being closed, the next "on" cycle of the timer 200 will permit the first load and unload circuitry 206 to respond to the demand for increased chilling capacity by signalling, for a predetermined time period, an increase in vane inclination angle of first (lead) compressor 2 through terminal 17. Because the signal to increase capacity lasts for only a predetermined limited time, each "on" cycle of timer 200 permits only an incremental increase, typically five percent, in chilling capacity of the system. Further, while the "on" portion of the cycle generated by timer 200 is of limited duration, typically twenty seconds, the "off" portion of the cycle is of much greater duration, perhaps as much as ten minutes. By setting the "off" portion of the cycle of time 200 much longer than the "on" portion, the controlled medium is given an opportunity to react to the increased chilling capacity of the refrigeration system, thereby automatically limiting the capacity of the system to approximately the minimum necessary to satisfy demand. This in turn minimizes power consumption. In addition, by allowing only incremental increases in capacity and requiring a reaction time between increases, power consumption is reduced and problems such as overshoot and low refrigerant temperature shutdown are substantially avoided.

Should the system require additional chilling, the preceding sequence is repeated until the lead compressor, in this example first compressor 2, has reached a maximum capacity, typically 85% of rated capacity. Maximum capacity is indicated by the closing of normally open switch 47, which prevents load circuitry 206 from further increasing the capacity of compressor 2 because an unload signal overrides a load signal in a manner described hereinafter. When the maximum capacity of first compressor 2 is reached, but additional chilling is required, a lag compressor start circuit 214 reacts by initiating loading of the second compressor, in this example second compressor 3, through second load and unload circuit 218. The lag compressor start circuit 214 also signals second compressor start circuit 212 to start second compressor 3. The start of compressor 3 begins as soon as compressor 2 hits the maximum capacity, or 85%; this usually occurs during the "on" cycle of timer 200. However, the internal controls on the compressor will prevent the machine from actually starting for up to several minutes. At the same time that the lag compressor start circuit 214 signals second compressor 3 to start, it also signals compressor 2 to unload to a predetermined value, for example 30% of maximum capacity, through first compressor load and unload circuit 206, because the normally open contacts of vane switch 45 complete a circuit through the unload portion of circuitry 206. While it is not necessary that first compressor 2 be unloaded for any circuit problem, maximum efficiency of the circuit requires that power demand be minimized. This is accomplished by unloading the first compressor 2 to a predetermined value and allowing the lag compressor, second compressor 3 in this example, to begin loading to some minimum value via a signal supplied to the second compressor start circuit 212 from the lag compressor start circuit 214. Once loading of second compressor 3 begins, the normally closed contacts of vane switch 53 will require the compressor 3 to continue to load until the predetermined minimum capacity is reached, whereupon the normally closed contacts of switch 53 open. Compressors typically used in refrigeration systems have an internal delay for startup, and therefore first compressor 2 will unload to the predetermined value before second compressor 3 will begin loading to the minimum value. For matched compressor the unload value on the compressor 2 will be typically equal to the load value on the compressor 3 for maximizing the energy savings available with the current invention; however, such equalization is not required and a weighted balance will be optimal for systems not using matched compressors. At this point, the lag compressor start circuit 214 has responded to a signal from the vane switch 47 and signaled the start circuit 212 to begin operation of the compressor 3. Both compressors 2 and 3 therefore are now both operating, although at substantially less than maximum capacity—e.g., 30% capacity. It should be noted that the sum of the chilling capacities of the compressors is preferably less than the maximum capacity of the single compressor since an increase in chilling efficiency is observed with the increase in surface area available for chilling from two compressors.

Should a demand for increased chilling capacity continue to exist, as manifested by normally open switch 37 being closed, during the next "on" cycle of the timer 200 the lead compressor, the first compressor 2 in this example, will load as described hereinbefore. It should be noted that although the compressors 2 and 3 are both operating at this point, a demand for increased chilling capacity does not result in a simultaneous increase in capacity for both compressor 2 and compressor 3. Rather, during the first "on" cycle of the timer 200 in which a demand for increased chilling capacity is indicated, the lead compressor, in this case compressor 2, increases capacity (or loads). In the next subsequent "on" cycle of timer 200 during which a demand for increased chilling capacity exists compressor 3 loads. This is accomplished in the following manner.

During the first "on" cycle of the timer 200 in which a demand for increased capacity exists after both compressors have become operational at a minimum capacity, an R3 transfer circuit 202 will require that the lead compressor (compressor 2) incrementally increase capacity as previously described. Once the first compressor 2 has incrementally increased in capacity, the R3 transfer circuit 202 will cause the capacity of the second compressor 3 to increase during the next "on" cycle of timer 200 during which the temperature switch 37 indicates a demand for additional chilling. Once the second compressor 3 has loaded, the R3 transfer circuit 202 causes the first compressor 2 to load on next demand. In this manner demands for increased capacity are met by alternately increasing the capacity of each compressor until demand is satisfied. Because only incremental increases (or decreases) in capacity are permitted due to circuit timing, system stability can be maintained with temperature switches sensitive to a one degree variation. Thus the temperature of the controlled medium may be maintained within a one degree range. This is in contrast to "proportional sensing" control devices which are made stable only by permitting wide variations, perhaps as much as ten degrees, in the temperature of the controlled medium.

Eventually system capacity will increase sufficiently to satisfy demand, and normally open switch 37 will remain open during the "on" cycle of timer 200. In such event no load or unload signals are generated by circuits 206 and 218, and the R3 transfer circuit 202 will remain dormant until the next demand for increased capacity.

In the event of a demand for decreased chilling capacity of the compressors 2 and 3, normally open switch 39 will close and normally open switch 37 will remain open, thereby signaling the load and unload circuitry 206 and the R4 transfer circuit 204 during the appropriate "on" cycle of timer 200 that a decreased capacity is necessary. At that point, the unload circuitry 206 signals the compressor vane inclination motor via terminal 17 on control device 1, as shown in FIG. 1, to decrease the inclination angle of the vanes on the centrifugal compressor 2. The R4 transfer circuit 204 performs a function analogous to that of R3 transfer circuit 202 in that it causes an alternating sequence in incremental unloading, while R3 circuit 202 caused alternation during loading. It should be noted that for the particular embodiment of the invention shown in FIG. 3, the capacity of the lead compressor will be decreased first; however, it is not necessary that the lead compressor unload first in all circumstances. As will be apparent to those skilled in the art, either the lead or the lag compressor may be unloaded first since unloading is similar to loading in that the compressors alternate to maintain a relatively balanced capacity. Thus, should a continuing demand for decreased capacity manifest by the closing of normally open switch 39, during the next "on" cycle the lag compressor, the second compressor 3 in this example, will unload via a signal applied to the second compressor load and unload circuitry 218. The compressor load and unload circuitry 218 is virtually identical to the circuitry 206 except that the circuitry 206, as described hereinbefore, controls the first compressor 2 whereas load and unload circuitry 218 controls second compressor 3. Further, and similar to unloading for first compressor 2, a signal from the temperature control switch 39 during the appropriate "on" cycle of the timer 200 signals the load and unload circuitry 218 and the R4 transfer circuit 204 to decrease the capacity of the compressor 3 by decreasing the vane inclination angle of the compressor 3 via terminal 33 of the control device 1.

Should a demand for decreased chilling continue to exist, both compressors will alternately back down by incremental amounts as described for loading until one of the compressors 2 or 3 reaches a predetermined minimum capacity, for example 25%, below which it is inefficient to operate both compressors. This minimum capacity is determined by vane switches 43 and 51 for compressors 2 and 3, respectively. At this point the invention requires that the second compressor be brought down incrementally to 25% during the subsequent "on" cycles of timer 200 during which a demand for decreased chilling exists. Should it occur that the first compressor to reduce to 25% is the lead compressor, the system will require that the capacity of the lag compressor be reduced by the previously explained increments until both compressors are at 25% of maximum capacity, or some other predetermined minimum value. In the event that an intermittent demand for decreased chilling results in the lead compressor being directed to reduce capacity below the predetermined minimum, such as 25% herein, load and unload circuitry 206 will internally sense the condition via vane switch 49, whereby the circuit 206 will be prevented from reducing the capacity of the compressor 2 below 20%. Should the lag compressor be signaled to reduce below the minimum capacity, vane switch 57 and circuitry 218 will prevent further reduction in capacity. Thus, only the compressor which is not at minimum capacity may be reduced in capacity, still incrementally, such that eventually both compressors reach the minimum capacity detected by switches 49 and 51. When both compressors reach the predetermined minimum capacity, lag compressor start circuitry 214 receives a signal from vane switches 43 and 51 and signals the lag compressor, in this case compressor 3, to shut down. In the event that the demand for chilling capacity is greater than that which 25% or the predetermined minimum of the lead compressor 2 can satisfy, loading begins on the first compressor 2 as previously described. It will be noted that only compressor 2 is operating at this point. In the event that the minimum capacity of compressor 2 is more than sufficient to meet demand for chilling the system, the control device 1 transfers control of compressor 2 to the low temperature control 41. In response to diminished demand for chilling, vane switch 41 signals pump start circuit 208 and shuts down both the first compressor 2 and the compressor pump via the compressor start circuit 210 and the pump start circuit 208.

The foregoing description has assumed normal operation of all system components including the compressors 2 and 3. In some circumstances this may not be the case, and a system failure will occur. In this event, the failure shut off circuitry 220 will recognize from the compressors 2 and 3 or the flow switches 93, 95, 97 and 99 that a compressor failure has occurred or that the control device 1 has failed. The failure circuitry 220 then prevents the operation of one or both compressors, depending upon the type of failure. For example, should a compressor fail to start when ordered to do so by the control device 1, the failure circuitry 220 will signal the remaining compressor to start automatically; as an additional feature, some embodiments (such as the microprocessor system of FIG. 5) will permit the user to select whether such a failure will prevent the system from being automatically restarted following the next system shutdown. However, manual override means are provided for operating the lone compressor while the remaining failed compressor is being repaired.

Attention is now directed to FIGS. 3a, 3b, 3c and 3d which, taken together, illustrate a preferred embodiment of the invention using relays by which it is possible to understand the detailed operation of the control device 1. The basic transfer and flow of the system was described in connection with FIG. 2; the following description merely repeats in greater detail that description.

Figure 3A:
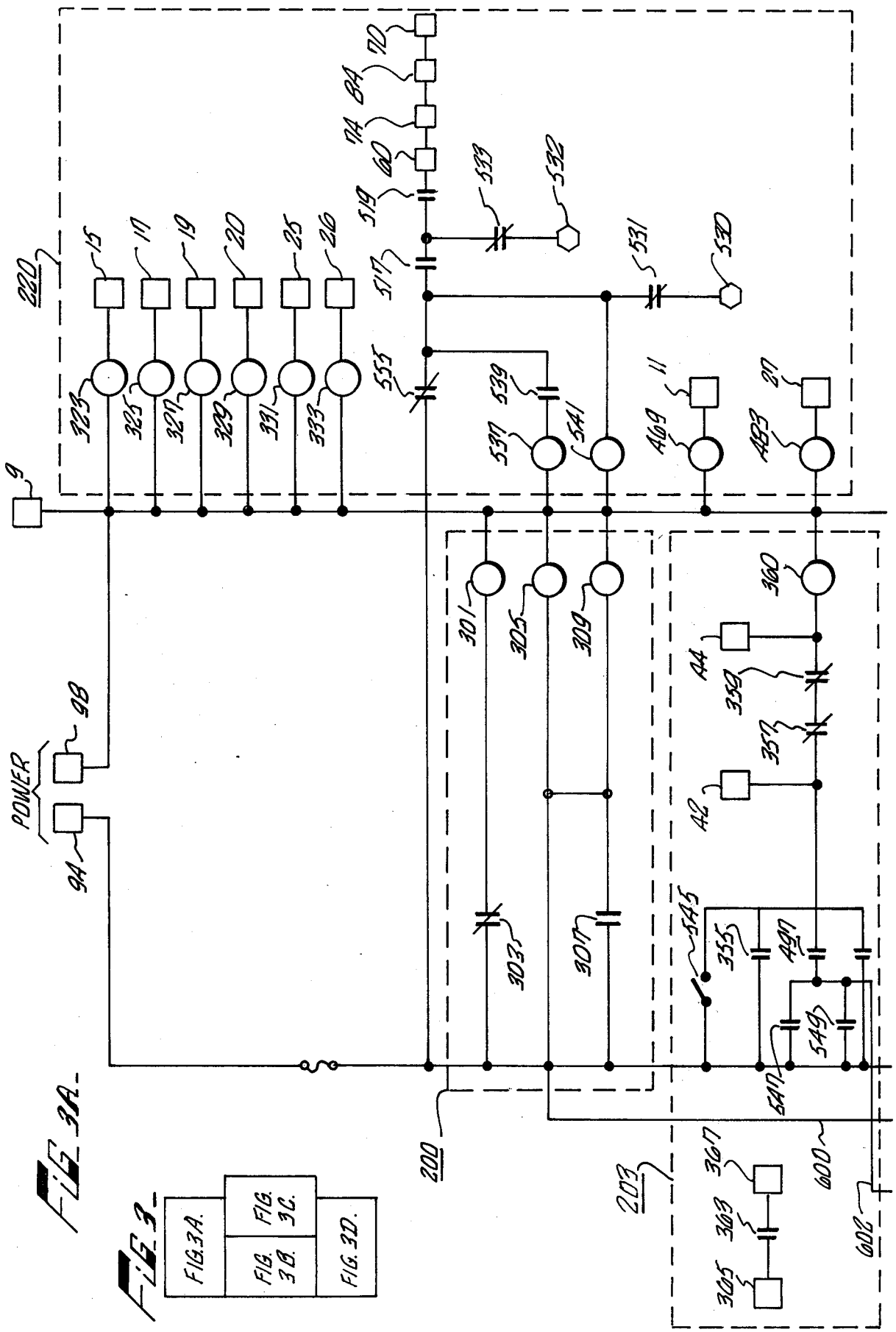

On initial start-up, power is applied to terminals 94 and 98. This causes, as shown in FIG. 3a, power to be applied to variable timer relay 301 through normally closed contacts 303 of normally closed bimetal of signal timer 305. When the timer relay 301 energizes, the normally open contacts 307 thereof close and, after the timing period of the on signal timer 305 is to create an asymmetric squarewave at the timer signal relay 309. For the embodiment herein described, the off cycle at the timer signal relay 309 is typically adjustable up to ten minutes due to adjustable timer relay 301, and the on cycle at timer signal relay 309 is typically fixed at approximately 20 seconds. However, these figures are substantially arbitrary and those skilled in the art will recognize many possible variations.

During the on portion of the cycle at timer signal relay 309, normally open contacts 311 (shown in FIG. 3b) of timer signal relay 309 close and permit power to pass between terminal 36 and either, depending upon conditions described hereinafter, terminal 38 or 40. As discussed in connection with FIG. 1, the temperature control switch 37 is connected between terminals 36 and 38, and temperature control switch 39 is connected between terminals 36 and 40. As further described in connection with FIG. 1, normally open switch 37 is closed and switch 39 is open if a demand for increased chilling is required by the thermostat in the controlled medium, or wherever load conditions may be conveniently sensed to provide a floating control signal. Thus, it can be seen that when switch 37 is closed, power passes between terminals 36 and 38 of FIG. 3b. Let is be assumed that, for purposes of example only, switch 37 is closed. Let is further be assumed that an automatic lead-lag switch 313 is in the lead position and that two sequence relays 315 and 317 are de-energized. It should be noted that relays 315 and 317 are merely parallel relays and, depending upon the number of contacts on the particular relay used, may be a single relay. Let is further be assumed that first safety relay 319 and second safety relay 321 are energized, and that first oil failure relay 323, second oil failure relay 325, first flow switch 331 and second flow switch 333 are all energized, while the first safety indication relay 327 and the second safety indication relay 329 are de-energized.

Given these initial conitions, a demand for increased chilling, indicated by switch 37 being closed, results in the following sequence:

When the time signal relay 309 energizes, an adjustable solid state control timer 335 (FIG. 3b) also energizes, and in turn, closes normally open contacts 337, which energizes a second control timer relay 339. This results in a continuous circuit between terminal 94 and 98 through contacts 311 of the timer signal relay 309, terminal 36, switch 37, terminal 38, normally closed contacts 341 of R3 relay 343, normally closed contacts 345 of second control timer relay 339, normally closed contacts 347 of first unload relay 349 and first load relay 351. It should be noted that second control timer relay 339 does not energize until control timer 335 times out, so contacts 345 open to terminate the load cycle. In addition, the signal from terminal 13 through contacts 341 of R3 relay 343 also cause a second bimetal time delay timer 353 to start timing as will be discussed in more detail hereinafter. Control timer 335 is typically an adjustable timer with a time period which may vary up to the time period "on" cycle of timer signal relay 309. Because timer 335 controls relay 339, it can be seen that first load relay 351 will be energized only for as long as timer 335 is adjusted.

When first load relay 351 energizes, normally open contacts 355 thereof, located in the pump start circuit 208 (FIG. 3a) close and make a complete circuit through normally closed contacts 357 of a first unload relay 349 and normally closed contact 359 of a second unload relay 361, thereby energizing a pump start relay 361. When the pump start relay 361 energizes, normally open contacts 363 thereof close and make a complete circuit between terminals 365 and 367, which cause the compressor pump (not shown) to start. Further, when the first load relay 351 energizes, normally open contacts 369 (FIG. 3c) thereof close, and permit a complete circuit between terminals 5 and 17. A voltage is supplied to terminal 5 whenever the controls internal to the compressor indicate a demand for chilling. By setting the compressor's internal controls to a value less than the anticipated chill water temperature, the compressor controls can be used as a signal source for loading or unloading the compressors through control device 1. In so doing, the control device 1 is operable without overriding any controls internal to the compressor. Terminal 21 is controlled by the second compressor 3 analogously. The closing of this circuit signals the control panel of compressor 2 to increase the vane inclination angle on that compressor to a predetermined minimum value determined by the position of the vane switch 49, typically set at 20% of maximum capacity. When power is first applied to terminals 94 and 98, first program motor relay 370 and second program motor relay 372 energize, causing (during normal operation) normally open contacts 374 of relay 370 and normally open contacts 376 of relay 372 to close. First and second minimum vane relays 469 and 483 also energize through normally closed vane switches 49 and 57, respectively. This causes a completed circuit between terminals 5 and 17 and 21 and 33 until a minimum vane angle is reached as indicated by the opening of switches 49 and 57 (FIG. 1), regardless of the condition of first load relay 351 or second load relay 413.

Figure 3D:
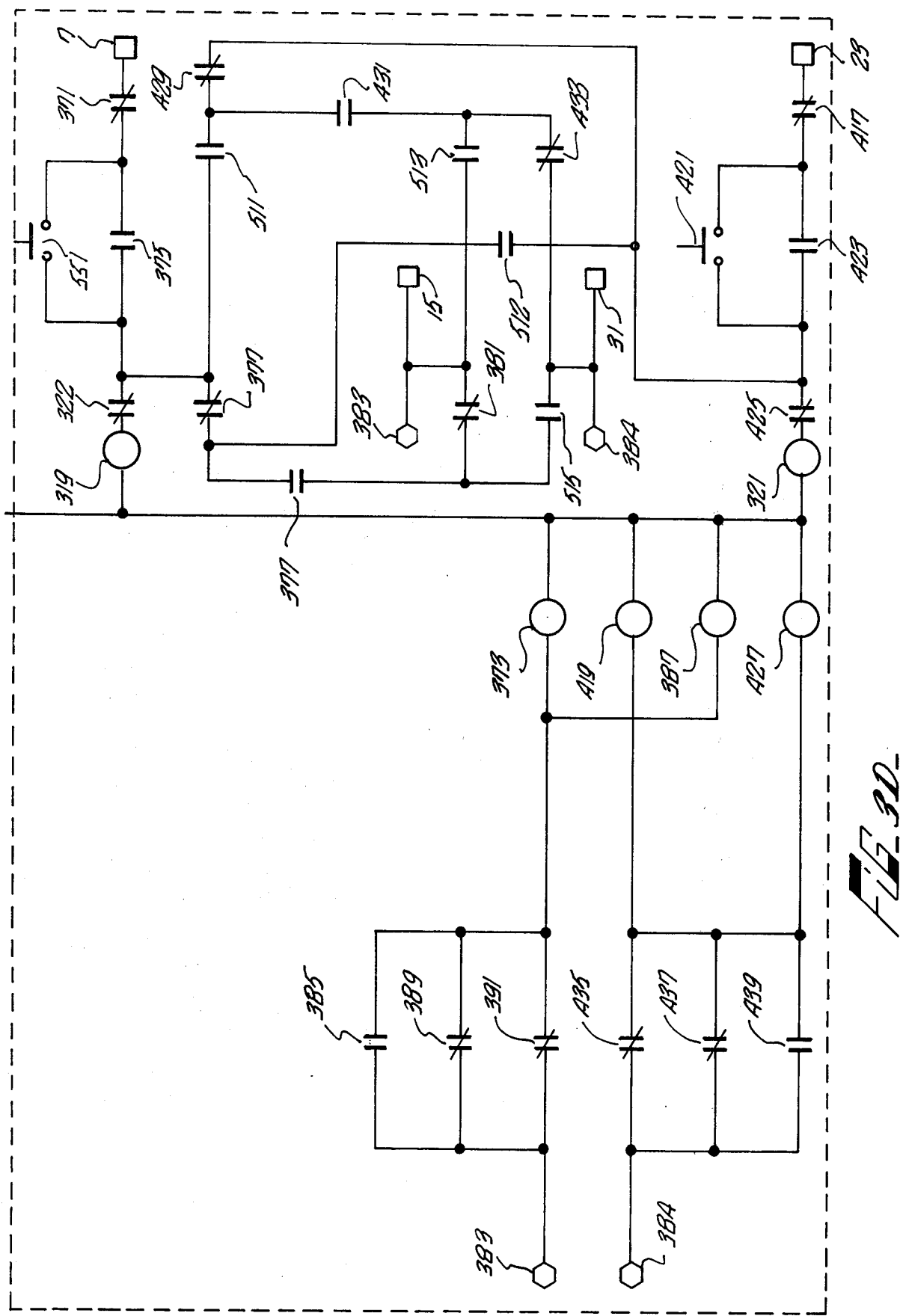

The first compressor 2 is started from a signal through terminal 15 in compressor start circuitry 210 (FIG. 3d). Terminal 15 is connected to the control panel of the compressor 2 and is always at a supply voltage sufficient to trigger the compressor's internal start circuitry. Thus, a signal applied to terminal 7 completes a circuit to terminal 15 through the normally closed contacts 371 of fifth bimetal delay timer 373, the normally open contacts 375 of energized first safety relay 319, normally closed contacts 377 of de-energized sequence relay 315, normally open contacts 379 of energized pump start relay 361, and normally closed contacts 381 of first sequence relay 315. Thus, a signal is supplied to terminal 15, which starts compressor 2; however, a signal is also supplied to terminal 383, adjacent to terminal 15, and should a failure exist in the internal controls of the compressor 2, the failure circuit 220 will cause the compressor to shut down in the following manner:

As set up in the initial conditions, the relays 323 and 331 are all energized while relay 327 is energized. In the event of a failure, normally open contacts 385 of the first safety indication relay 327 can cause ninth bimetal delay timer 387 and fifth bimetal timer 373 (as a backup) to signal first safety relay 319 which suts out a signal to terminal 15. The failure shutdown circuit 220 will be discussed in greater detail in connection with FIG. 3a.

In a similar manner, normally closed contacts 389 of first oil failure relay 323 and normally closed contacts 391 of first flow switch relay 331 can cause a start signal to terminal 15 to be interrupted. Assuming that no failure occurs, the condition of the circuit at this point is that the compressor pump start circuit 208 has activated the pump start circuit via terminals 365 and 367 and the compressor 2 has been started.

Should a demand for increased chilling continue to exist, as through switch 37 being closed, the next "on" cycle of timer signal relay 309 triggers control timer relay 335 in the manner hereinbefore described. Control timer relay 335 then signals second control timer relay 339, which in turn permits first load relay 351 to energize for the time period of the control timer 335, thus permitting incremental loading of the compressor 2 as described before. Control timer relay 335 is typically an adjustable solid state timer which permits the increase in capacity to be varied over a predetermined range. Typically, such an increase might be 5% during each "on" cycle; for many of the compressors used with such a controller, vane angle increases approximately at 1% per one-tenth second. However, the time required varies with each type of compressor. If the "off" cycle of timer 200 is five minutes and the "on" cycle is 20 seconds, during which the control timer pulse occurs, a 15% increase in capacity is available over roughly a 15 minute span.

Loading of the lead compressor, first compressor 2 in this example, will continue as described above with an incremental increase occurring during each "on" cycle of the timer 200. Should the demand for increased chilling capacity continue to exist for a long enough period of time, compressor 2 will load to a maximum capcity beyond which operation of the compressor becomes inefficient relative to energy consumption. The capacity at which a compressor becomes inefficient is normally determined by the design of the compressor itself; typically, a maximum efficient capacity might be 85%. Should the demand for increased chilling capacity cause the capacity of the compressor 2 to reach the predetermined maximum value, the capacity of compressor 2 will be reduced to a predetermined value, and the compressor 3 will be automatically started by the following sequence. When compressor 2 reaches 85% of capacity, normally open vane switch 47 will close, completing the circuit between terminals 70 and 68 (FIG. 3c). This, in turn, completes a circuit between terminals 68 and 78 through normally closed contacts 393 of a first sequence control relay 395. It should be noted that the sequence control relay 397 and the first sequence control relay 395 are merely parallel relays and could be a single relay. Once a circuit is completed to terminal 78 (and also terminal 64) a circuit is completed through the normally closed contacts on vane switch 53 causing power to reach terminal 80. When power is applied to terminal 80 (FIG. 3c), a circuit is completed through normally closed contacts 399 of sequence relay 317, thereby energizing recycle relay 401. It should be kept in mind that sequence relay 317 is de-energized, in compliance with the assumed initial conditions. When recycle relay 401 energizes, it is locked into the energized state via the normally closed contacts of vane switch 53, and normally open contacts 403 thereof complete a circuit between terminal 68 and sequence control relays 395 and 397, until the vane position of second compressor 3 has reached the position which opens the normally closed contacts of vane switch 53. At the same time, normally open contacts 405 of recycle relay 401 close to maintain a continuous circuit between terminals 68 and 78. In addition, normally open contacts 407 of a Recycle Relay 401 close and through normally closed contacts 409 of the sequence relay 317 and normally closed contacts 411 (FIG. 3b) of the second unload relay 361. The second load relay 413 is energized.

When vane switch 47 indicates that first compressor 2 has reached the maximum efficient capacity, thereby signaling the start of the lag compressor, the capacity of lead compressor, compressor 2 here, is automatically reduced to some substantially smaller capacity, in the following manner. When a voltage is applied to terminal 68 from vane switch 47, this voltage reaches terminal 64 as described above, which supplies power to vane switch 45 as shown in FIG. 1. Since the normally open contacts of vane switch 45 have closed by the time first compressor 2 reaches the capacity for which vane switch 47 is set, application of a voltage to terminal 64 causes the voltage to reach terminal 62 (FIG. 3c). This causes first unload relay 349 (FIG. 3b) to energize through normally closed contacts 509 (FIG. 3c) of sequence relay 317, normally open contacts 510 of energized recycle relay 401, and normally closed contacts 505 of sequence relay 317. When first unload relay 349 energizes, normally closed contacts 347 thereof cause first load relay 351 to deenergize and also cause a circuit to be completed between terminals 5 and 19 through normally open contacts 374 of first program motor relay 370, normally closed contacts 467 of first minimum vane relay 469 and normally open contacts 465 of energized first unloaded relay 349. This causes first (lead) compressor 2 to unload until the closed, but normally open, contacts of vane switch 45 reopen. As previously noted, switch 45 is typically set for 30% of maximum vane position, so the vane position, and the related chilling capacity of compressor is reduced to 30% by this signal originating from lag compressor start circuit 214, at the same time that second compressor 3 is being loaded and started.

The second compressor 3, the lag compressor in this example, is started by a signal applied to terminal 31 from terminal 23 in the following manner. The voltage at terminal 23, which exists continuously, is applied to terminal 31 via normally closed contacts 417 of seventh delay timer 419, and then through manual reset switch 421 or normally open contacts 423 of second safety relay 321. The voltage then passes through normally open contacts 425 of eleventh delay timer 427, whereupon a second safety relay 321 is energized. The voltage at terminal 23 passes through normally closed contacts 429 of sequence relay 315. When lag compressor start circuit 214 receives a signal from vane switch 53, which causes the second compressor start relay 395 to energize as described above, normally open contacts 431 of energized second compressor start relay 395 close and the voltage at terminal 23 is applied to terminal 31 normally closed contacts 433 of the first sequence relay 315. A voltage signal at terminal 31 starts the lag compressor or second compressor 3. As with lead compressor 2, a failure internal to compressor 3 may manifest through normally closed contacts 435 of the second flow switch relay 333, or through the normally closed contacts 437 of the second oil failure relay 325, or through the normally open contacts 439 of the second safety failure relay 329. Any of these failures cause seventh bimetal delay timer 419 and ninth bimetal delay timer 427 to activate, opening the circuit between terminals 23 and 31, thereby shutting down lag compressor 3. Timers 419 and 427, as with timers 373 and 387, are normally closed timers with a time duration of from 10 seconds or less to more than 60 seconds, depending upon the compressor used.

Assuming no failure is detected, the system is now in the condition that the lead compressor 2 is operating at a pre-determined low capacity, for example thirty percent (30%), and lag compressor 3 has been started and has been brought up to some pre-determined capacity, typically also thirty percent (30%).

Should the control medium still require additional chilling capacity, again manifested through temperature control switch 37, the control device 1 will require an increase in capacity on the lead compressor 2 as follows. In connection with FIG. 2, it was pointed out that either lead compressor 2 or lag compressor 3 could be the initial compressor to load during operation of both lead and lag compressors. However, it was further pointed out that, for the particular embodiment shown in FIG. 3, the lead compressor, assumed to be compressor 2, will load first because normally closed contacts 444 of second compressor start relay 397 faster than normally open contacts 445 thereof close, which causes the R3 relay 343 to be de-energized at the beginning of the next "on" cycle of timer 200. Thus, with the R3 relay 343 de-energized, loading occurs on the lead compressor 2 in the same manner as the initial loading previously described. However, in addition to the relays activated during loading as described in connection with initial start up, a second bimetal delay timer 353, a normally open timer, closes and starts timing. This, in turn, closes normally open contacts 441 thereof found in R3 transfer circuit 202 (FIG. 3b). It should be noted that the time period of the delay timer 353 must be greater than the time period of the on cycle of the timer signal relay 309. This causes a completed circuit to occur between terminal 94 and 98, or power, after the "on" cycle of timer 200 has terminated; that is, a completed circuit exists through normally closed contacts 443 of timer signal relay 309, normally open contacts 441 and normally open contacts 445 of energized second compressor start relay 397. This energizes the R3 transfer relay 343. Once R3 relay 343 energizes, it is locked into the energized state via normally open contacts 447 of relay 343 and normally closed contact 449 of first bimetal delay timer 451 and normally open contacts 445 of second compressor start relay 397. As will be discussed hereinafter, a failure on second safety relay 321 will cause normally open contacts 453 to open and will also de-energize the R3 relay 343. However, during normal operation once R3 relay 343 energizes, normally closed contacts 341 thereof (adjacent to terminal 38) open and at the same time normally open contacts 455 thereof close. This causes, during the next on cycle of timer 200 during which a demand for increased chilling exists, the resulting load signal to be channeled to second load relay 413, rather than first load relay 351. It can be seen that the path is similar to that for the first load relay 351: that is, the current flows through contacts 455 of the R3 relay 343, then through normally open contacts 457 of the second control timer relay 339, through normally closed contacts 411 of unload relay 361 and thence through second load relay 413. This causes the second compressor 3 the lag compressor, to increase in capacity through a signal applied between terminals 21 and 33 as described previously. At the same time, normally closed first bimetal delay timer 451 is started timing. As with the second delay timer 353, the time period for the first bimetal delay timer 451 is slightly longer than the "on" cycle of timer signal relay 309. Therefore, normally open contacts 459 of the timer signal relay 309 will have opened and at the same time normally closed contacts 449 of the first delay timer 451 will also be open, causing the R3 relay 343 to de-energize. This, in turn, causes the lead compressor 2 to increase vane position on the next cycle in which a demand for increased capacity exists.

It can be seen from the above that because of R3 transfer cicuit 202, increases in capacity are alternately channeled between the lead compressor 2 and the lag compressor 3, during the appropriate "on" cycle of the timer 200. Thus, an approximate balance in vane positions of compressors 2 and 3 is maintained, and the efficiency of the system maximized, thereby minimizing power consumption.

Should additional chilling capacity be required, the lead compressor 2 and the lag compressor 3 will alternately load as previously described. Since good system design will prevent both the first compressor 2 and the second compressor 3 from being loaded to maximum capacity, the system is permitted to increase to the necessary capacity at some value less than that maximum. Thus, the system should settle into a chilling capacity where switch 37 is no longer closed—that is, no demand for increased chilling—and normally open switch 39 remains open. This of course requires that a "dead band" exist between switches 37 and 39, but this band may be reduced to as little as one degree while maintaining system stability, depending upon the compressor used. In such a condition, R3 relay neither energizes nor de-energizes, depending upon the last state during which a demand was required, during subsequent "on" cycles of timer 200 and therefore R3 transfer circuit 202 remains dormant while no demand for increased chilling exists.

At some point, the system will require less chilling capacity and a demand for decreased chilling will manifest by the closing of normally open switch 39, also controlled by the thermostat. Switch 39 is also typically provided with a set of normally closed contacts for application in pneumatic compressor controls system to insure that a pneumatic compressor failure causes control device 1 to lock into an unload mode. As with the process of increasing capacity, a command to decrease capacity is only received by the controller during the "on" portion of the timer signal relay 309 cycle. That is, during the "on" signal of the timer signal relay 309, normally open contacts 311 thereof close and because of the condition of switch 39 a circuit is completed between terminals 36 and 40. This in turn causes first unload relay 349 to energize by completing a circuit between terminals 94 and 98 through normally closed contacts 461 of the R4 transfer relay 463 and normally closed contacts 465 of the control timer relay 339. When first unload relay 349 energizes, a circuit is completed between terminal 5 and terminal 19 through normally open contacts 374 of a first control relay 370, normally open contacts 465 of first unload relay 349 and through normally closed contacts 467 of first minimum vane relay 469. In this manner, a signal is sent to the first compressor 2 indicating that the vane angle should be decreased. At the same time that first unload relay 349 is energized, a fourth bimetal delay timer 469, a normally open bimetal timer, is energized and starts timing.

As with second bimetal delay timer 353, fourth bimetal delay timer 469 has a time duration slightly longer than the "on" portion of timer signal relay 309. Because of this, the R4 transfer relay 463 will energize during the time period in which bimetal timer 469 is closed and the timer signal relay 309 is de-energized. This circuit is completed through normally closed contacts 443 of the timer signal relay 309, then normally open contacts 473 of the timer signal relay 309, then normally open contacts 473 of the fourth bimetal timer 469, and normally open contacts 475 of the second compressor start relay 397. It should be noted here that this circuit is quite similar to the circuit which energized R3 transfer relay 343 during the load sequence. When R4 relay 471 energizes, normally closed contacts 461 open, thus preventing first unload relay 349 from energizing during the next on-cycle of timer 200. At the same time, normally open contacts 477 of R4 relay 471 close when relay 471 energizes. Thus, during the next "on" cycle of the timer 200 in which a demand for decreased chilling is present, a circuit is completed which causes the second unload relay 361 to energize. This circuit is completed between power supply terminals 94 and 98 through contacts 311 of the timer signal relay 309, terminals 36 and 40, contacts 477 of the R4 relay 471, normally closed contacts 479 of the second control timer relay 339 and thence the second unload relay 361. This in turn causes an unload signal to be generated between terminals 21 and 35 through normally closed contacts 481 of second minimum vane relay 483 and normally open contacts 485 of the energized unload relay 361. When the second unload relay 361 energizes, third bimetal delay timer 487, a normally closed timer analogous to first bimetal delay timer 451, will open and remain open for a timer period slightly longer than the "on" signal of timer signal relay 309. This in turn will cause the R4 relay 471 to de-energize, because the lock-in circuit—comprised of normally open contacts 489 of R4 relay 471, normally closed contacts 491 of third delay timer relay 487 and contacts 475—will be broken at contacts 491 as well as normally open contacts 493 of timer signal relay 309. Thus the R4 relay 471 will de-energize, permitting first unload relay 349 to unload the first compressor 2 on the next cycle of timer 200 during which a demand for decreased chilling exists. Again, the similarity between R4 transfer circuit 204 and R3 transfer circuit 202 should be noted, keeping in mind that the R3 transfer circuit 202 applies to loading compressors 2 and 3 when a demand for increased chilling capacity exits, whereas the R4 transfer circuit 204 operates during unloading when a demand for decreased chilling capacity exists. Because the transfer circuits for loading and unloading are independent, the maximum imbalance in vane positions between compressor will be incremental increase or decrease.

As described above, lead compressor 2 and lag compressor 3 will continue to unload so long as a demand for decreased chilling capacity is manifested by the condition of temperature switch 39. Should a demand for increased chilling occur, loading will occur exactly as described previously in connection with R3 transfer circuit 202 and load and unload circuits 206 and 218. However, should a demand for increased capacity not occur, and the system continue to demand decreased chilling, both compressors will alternately unload until one compressor reaches some predetermined minimum vane position fixed by vane switches 43 and 51, typically 25% of maximum vane position, below which operation of both compressors 2 and 3 is inefficient. Of course, both compressors will not reach the predetermined minimum capacity at the same time; rather, one of the compressors will reach the predetermined minimum and perhaps attempt to decrease below that minimum capacity during the cycle in which an unload signal exists. However, whichever compressor reaches the minimum capacity first will be prevented from reducing the vane angle of that compressor to less than the setting of either vane switch 49, (if compressor 2 reaches minimum capacity first) or vane switch 47 (for compressor 3), typically twenty percent of maximum vane angle. That this occurs can be seen by observing the circuit between terminals 5 and 19, normally closed contacts 467 of first minimum vane relay 469 (which is controlled by vane switch 49) will be opened when unload circuit 206 attempts to decrease the vane angle of compressor 2 below the setting of switch 49. This will break the circuit between terminals 5 and 19 causing a loss of power to terminal 19 which prevents compressor 2 from unloading further in response to a signal from control device 1. Similarly, should compressor 3 reach minimum capacity and attempt to continue to decrease in capacity, normally closed contacts 481 of second minimum vane relay 483 will open due to the opening of vane switch 57, thereby opening the circuit to terminal 35. It should be noted that this occurs because terminals 48 and 72 are connected to terminal 98 through normally open contacts 495 of the energized second compressor start relay 397. If a demand for decreased chilling capacity continues to exist, the remaining compressor will decrease in capacity until it reaches the predetermined minimum. At this point, second compressor start relay 397 will de-energize since vane switch 51 or 43 will open and remove power to terminals 48 and 72. This is turn causes the lag compressor 3 to shut down since normally open terminals 431 of second compressor start relay 395 open, thereby shutting off power to terminal 31 found in compressor start circuit 212 (FIG. 3d). Thus, when compressors 2 and 3 reach 25% of capacity, the lag compressor 3 automatically ceases operation, leaving the lead compressor 2 operating at 25% (or possibly 20%) of maximum vane position. Should additional capacity for chilling be required, during the next "on" cycle of timer 200, switch 37 will be closed and loading will begin as described previously solely for the first compressor 2. However, should even less chilling capacity be sufficient to satisfy the system, command of the compressor 2 will be transferred to low limit shut down switch 41 via terminals 42 and 44. It should be noted that switch 43 no longer has an effect since relay 397 is no longer energized. Should demand for chilling be so limited as to permit low temperature shut down switch 41 to control, the opening of switch 41 will disconnect the circuit to pump start relay 361 (FIG. 3a), thereby de-energizing that relay and opening normally open contacts 497 thereof in pump start circuit 208 as well as disconnecting power to terminal 15 via normally open contacts 379 of pump start relay 361. This both turns off the compressor pump and turns off compressor 2. The system is thus entirely shut down.

When the system shuts down, automatically lag switch 313 alternates its position in response to an alternator signal applied to terminal 6, such that what had previously been the lead compressor will now become the lag compressor and vice versa. The alternator signal is generated externally to the control device 1. In addition, the lag switch 313 is typically provided with manually selectable positions for setting either the first compressor 2 or the second compressor 3 as the lead compressor. Therefore, since in this example compressor 2 had been the lead compressor, the compressor 3 will upon next startup be the lead compressor. This occurs because the alternation in position of lead lag switch 313 permits sequence relays 315 and 317 to energize immediately upon application of power to terminals 94 and 98 at initial start-up. In such a circumstance, all normally closed contacts of sequence relays 315 and 317 will open and remain open until the next system shut-down; in contrast, all normally open contacts of sequence relays 315 and 317 will close until the next alternation of the switch 313, barring a failure. While this will affect the order in which compressors 2 and 3 are called into operation, and subsequently the loading and unloading thereof, operation is in all other respects the same as previously described. This is apparent from the parallelism of normally open and normally closed contacts for the sequence relays 315 and 317. For example, normally open contacts 499 (FIG. 3c) are analogous to normally closed contacts 399, normally open contacts 501 are analogous to normally closed contacts 409, normally open contacts 503 are analogous to normally closed contacts 505 and normally open contacts 507 are analogous to normally closed contacts 509, all found in lag compressor start circuit 214 and load and unload circuits 206 and 218 (FIG. 3b). Further, in the compressor start circuits 210 and 212 (FIG. 3d), normally open contacts 511 are analogous to normally closed contacts 377, while normally open contacts 513 are analogous to normally closed contacts 433 and normally open contacts 515 are analogous to normally closed contacts 381. Thus, it can be seen that the sole effect of the lead lag switch 313 is to merely alter the sequence in which compressors 2 and 3 operate, thereby assuring substantially equal use of each compressor.

It has thus far been assumed the vane switches 43,45,47,49 (first compressor 2), 51, 53, 55 and 57 (second compressor 3) are directly controlled by the vanes of the first compressor 2 and the second compressor 3. In fact, this is not correct, although the switches recited above are triggered from signals generated by program motors timed to duplicate the actual vane positions. By using program motors timed to operate at speeds substantially identical with those of the actual compressor vane motors, it is possible to make control device 1 as a unit needing no mechanical connection with the first compressor 2 or second compressor 3, instead using only electrical connection.

For example, when the vane position on the compressor 1 is being increased through a signal at terminal 5, a circuit is completed to terminal 17 through contacts 374 of control relay 370, and either contacts 369 of first load relay 351 or contacts 368 of the minimum vane relay 469. This applied power to the actual compressor vanes. At the same time, power is applied to the increase control of program motor 621 through corresponding contacts 623 of the control relay 370 and contacts 625 of the first load relay 351 or contacts 627 of the minimum vane relay 469. This causes the specially selected program motor to track the variation in position of the actual vanes of the first compressor 2.

During unloading the operation is only slightly different. Again contacts 629 of minimum vane relay 469 correspond to contacts 467, and contacts 631 of first unload relay 349 correspond to contacts 465. However, normally closed contacts 633 of the first control relay 370 provide a by-pass rather than a series connection to control the unload line of program motor 621. This is because the internal compressor controls may require the compressor 3 to unload whereupon power would be removed (by the compressor itself) from terminal 5 and applied to terminal 19. This requires that a pathway not dependent on the minimum vane relay 469 or the first unload relay 349 exist for unloading the program motor. Contacts 633 of the control relay 370 provide the requisite pathway.

With reference to the second compressor 3, operation of second program motor 635 is analogous. Contacts 637 of second control relay 372 correspond to contacts 376; contacts 639 of second load relay 413 correspond to contacts 415; and contacts 641 of minimum vane relay 483 correspond to contacts 366 thereof, all to control increase line 643 of program motor 635. For unloading, contacts 645 of the second minimum vane relay 483 correspond to contacts 481 and contacts 647 of second unload relay 361 correspond to contacts 485. As with the first compressor 2, contacts 649 of the second control relay 372 provide a by-pass to the decrease line 651 of second program motor 635 so that the second program motor 635 so that the second program motor 635 may respond to vane position changes signalled by controls internal to the compressor. An alternative to the program motors and vane switches herein described is a mulitiposition, relay- or solenoid-actuated switch as described in connection with FIGS. 6a–6b herein. In the solid state embodiments of the invention shown in FIGS. 4a–4e, and 5, the program motors are replaced by timers.

The foregoing description has assumed proper, normal operation of both the compressors 2 and 3 as well as the control device 1. Inevitably, however, failures will occur which prevent the operation of either one or both compressors. In this event, the present invention includes various means for advantageously employing the internal faul detection devices of the compressor and also for detecting and signalling to the user failures within the entire system including the control device 1. First and second oil failure relays 323 and 325, first and second safety indication relays 327 and 329 and first and second flow switch relays 331 and 333, all located in failure shutoff circuit 220 (FIG. 3a), have previously been discussed. These relays indicated failures internal to the compressor itself. As previously discussed, a failure causing any of these relays to depart from its normal state will cause first safety relay 319 or second safety relay 321 to de-energize and will shut down the failed compressor 2 or compressor 3, through the opening of normally closed contacts 371 of fifth bimetal timer 373 and normally closed contacts 322 of ninth bimetal timer 387 (with respect to compressor 2), or normally closed contacts 417 of seventh bimetal timer 419 and normally closed contacts 425 of eleventh bimetal timer 427 (with respect to compressor 3). Each of these timers typically has a time duration adjustable up to 60 seconds. At the same time, normally open contacts 517 of safety relay 319 or normally open contacts 519 of safety relay 321 will disconnect the common side of vane switches 43, 51, 55 and 47 through terminals 60, 74, 84, and 70, respectively. This will prevent the operation of more than one compressor during the "on" cycle in which the failure continues to exist, since vane switches 47 and 55 control the start of the lag compressor. Further, should a failure occur after the second compressor has started, the failed compressor will be directed to completely unload—i.e., return to zero capacity—through normally closed contacts 531 (FIG. 3a) of first safety relay 319 or normally closed contacts 533 of second safety relay 321, which directly feed to first unload relay 349 (FIG. 3c) and second unload relay 361, respectively, through respective lines 530 and 532.

In addition to causing the failed compressor to unload and shut down, the failure shut down circuitry 220 will also cause the control device 1 to recognize whichever compressor has not failed as the lead compressor by a signal directed to sequence circuitry 216 (FIG. 3b). For example, should first compressor 2, previously assumed to be the lead compressor, fail, first safety relay 319 would de-energize and normally closed contacts 535 (FIG. 3b) of relay 319. would return to the closed position. This causes sequence relays 315 and 317 to energize, which places second compressor 3 in the lead position in the manner previously described. In contrast, should second compressor 3 fail, second safety relay 321 is de-energized, causing the close of normally closed contacts 453 thereof. This results in the de-energization of sequence relays 315 and 317, or switch 313. Thus, if second compressor 3 fails, first compressor 2 is designated the lead compressor. Also, the de-energization of relay 319 or 321 is indicated to the user through failure indication lamp 537 controlled by normally closed contacts 539 of relay 319 or lamp 541 controlled by normally closed contacts 543 of relay 321.

In addition to forcing the non-failed compressor into the lead position, failure shut off circuit 220 prevents the entire system from automatically restarting after the next system shutdown. When shutdown occurs and a failure has been indicated by the de-energizing of either relay 319 or 321, the de-energizing of pump start relay 361 causes normally closed contacts 543 thereof to close. This causes both first unload relay 349 and second unload relay 361 to energize, thereby preventing automatic energizing of either first load relay 351 (because of normally closed contacts 347 of now-energized relay 349) or second load relay 413 (through normally closed contacts 411 of relay 361). Thus it is seen that an unload signal has priority over a load signal.

System start switch 545 (FIG. 3) typically a momentary contact switch, is provided to permit manual operation of pump start circuit 208. However, because of normally open contacts 547 of first safety relay 319, normally open contacts of second safety relay 321, normally closed contacts 357 of energized first unload relay 349 and normally closed contacts 359 of energized second unload relay 361, if both compressors 2 and 3 have failed, pump start relay 361 cannot be locked in until safety relays 319 and 321 have been manually reset by switch 421 (second safety relay 321) and switch 551 (first safety relay 319).

Another typical failure in refrigeration systems, also detected and compensated for by the present invention, is the false start of the lag compressor—that is, the lag compressor received a start signal from the control device, but fails to start. Certain prior art control devices assume the lag compressor has started when in fact it has not. By means of normally closed bimetal false start timer 553 (FIG. 3c), false starts of the lag compressor are detected. During normal operation, recycle relay 401 is energized until the vanes on the lag compressor have increased in position sufficiently to open the normally closed contacts of either vane switch 45 or 53. In the event of a fale start, however, recycle relay 401 will remain energized indefinitely since the vane position on the lag compressor cannot change until the compressor has started due to the internal compressor controls. By setting the time duration of the false start timer 553 for a period longer than the period during which recycle relay 401 should be energized, a false start will permit timer 553 time out, thereby opening normally closed contacts 555 thereof and disconnecting power to vane switches 43, 47, 51 and 53. As previously described, this causes a loss of power to the lag compressor start circuit, leaving only the lead compressor operating. Because of start-up delays internal to compressors used in such refrigeration systems, the lead compressor will have unloaded to the setting of either vane switch 45 or 53 (typically 30% of maximum vane position) prior to the opening of contacts 555. Thus the lead compressor will begin loading again at the next "on" cycle of timer 200. If demand for increased chilling again requires that the lag compressor be started, after incremental increases in lead compressor capacity, vane switch 47 or 55 will again energize the lag compressor start circuit 214.

Another failure which occasionally occurs and which can cause system overload damage is the failure of the temperature controller. Should the temperature controller (switches 37 and 39) fail to a state indicating continuous demand for increased chilling capacity, when in fact the system has cooled the controlled medium to a point sufficient to permit control device 1 to transfer system control to low temperature shutdown circuit 41, the system will be automatically shut down in the following sequence. The lead compressor will load to maximum capacity from the signal received from failed temperature control switch 37. When the lead compressor reaches maximum capacity, load and unload circuit 206 or 218 will cause the lead compressor to unload, by energizing the approapriate unload relay 349 or 361. This opens contacts 357 or 359 (FIG. 3a); since low temperature switch 41 has already opened, the pump start 361 de-energizes. This causes both unload relays 349 and 361 to energize through normally closed contacts 557 of the timer signal relay 309, and normally closed contacts 559 and 543 of the pump start relay 361, thereby reducing vane position on both compressors to a minimum position. The lead compressor is also stopped when the pump start relay 361 de-energizes through normally open contacts 379 thereof. Because of the delays inherent in compressors typically used in such refrigeration systems, the lag compressor will not start even though it receives a temporary start signal since vane position on both compressors will be such that vane switches 43 and 51 prevent second compressor start relays 395 and 397 from locking in. Thus the entire system will shut down, thereby avoiding problems of icing or other overload damage. Further, because contacts 557 are controlled by timer signal relay 309, the system is not permitted to attempt to restart until the next "on" cycle of timer 200, which prevents cycling. It should also be noted that the contacts 559 and 543 of the pump start relay 361, together with contacts 557 of timer signal relay 309, place the load and unload circuits 206 and 218 in an unload mode on any system shutdown where the safety relays 319 and 321 are energized, thereby complementing the unload circuitry internal to the compressor.

Also provided are manually set switches 559 and 561 (FIG. 3b) for manually controlling the loading and unloading respectively, of the first compressor 2 and the second compressor 3. By placing switches 313, 421, 551, 545, 559 and 561 at a location remote from control device 1, remote manual control of the system is possible.

Attention is now direction to FIGS. 4a–4e, which are logic gate schematic diagrams suitable for performing functions substantially identical with those performed by the circuit shown in FIGS. 3a–d. Not shown in FIGS. 4a–e are the conventional analog-to-digital and digital-to-analog converters and buffers necessary to convert signals to the appropriate voltage levels suitable for use within the control device 1 or the first and second compressors 2 or 3. Correspondence between the circuit elements of FIGS. 3a–d and FIGS. 4a–e is shown whenever possible by assigning to the appropriate logic gate the same numerical designator as found on the corresponding circuit elements shown in the relay embodiment of FIGS. 3a–d. For example, a first safety latch 370 found in FIG. 4d corresponds to first safety relay 370 found in FIG. 3d. To further aid in establishing the correspondence between the embodiment of FIGS. 4a–d and FIGS. 3a–d, the logic gate embodiment of FIGS. 4a–d is shown in functional blocks as in FIG. 2, with the signal sources for each block designated by the numeral associated with the gate generating the respective signal.

As to the particular elements shown in FIGS. 4a–e, particular attention should be paid to first delay timer 451, second delay timer 353, third delay timer 487 and fourth delay timer 469. All four timers are conventional one-shot timers with time durations as for their bimetal counterparts, and triggered on a positive transition. For timers 353 and 469, the output is taken from the true (Q) output; whereas for timers 451 and 487, the output is taken from the complement (Q) output. Variable time duration is provided by using a variable resistor in the RC time control circuit of the one shot. Control timer 339 is also a variable time duration one-shot triggered by a positive transition with a true (Q) output.

In FIG. 4d, particular attention should be given to first safety latch 319 and second safety latch 321. Both are conventional bistable latching circuits with outputs taken from the complement (Q) output lines. In such a configuration the reset line of latch 319 is that fed by reset switch 551 and associated circuitry; the set line is fed by an "and" gate 701 with input signals from gates 319, 373 and 387. Similarly, for latch 321, the reset line is fed by reset switch 421 and associates logic as shown and the set line is fed by an "and" gate 703 with input signals from gates 321, 419 and 427. Thus, the function observed at the output of gates 319 and 321 is analogous to its relay counterparts.

Attention is also directed to solid state triggers 705 and 707 found in FIG. 4d. These triggers are conventional solid state control devices, triggered by typical logic levels, for permitting the AC signal at terminals 7 and 23, respectively, to reach terminals 15 and 31, respectively.

Fifth delay timer 373, seventh delay timer 387, ninth delay timer 419 and eleventh delay timer 427, all shown in FIG. 4d, are variable time diration one-shot timers triggered by a positive transition with complement (Q) outputs. The time duration corresponds to that used in the corresponding bimetal delay timers.

Attention is especially idrected to FIG. 4e, which illustrates a solid state counterpart of program motors 621 and 635. Since program motors 621 and 635 operate by matching times with the vane inclination motors on the compressors 2 and 3, a conventional up-down counter can serve the same function as the program motor. Program counter 709 with associated combinational and sequential logic 711 is intended to replace the first program motor 621 and vane switches 43, 45, 47 and 49 while second program counter 713 and associated combinational and sequential logic 715 replace the second program motor 635 and vane switches 51, 53, 55 and 57. The program counters 709 and 713 are typically eight bit up-down counters with gate 717 feeding the count up enable line while gate feeding the count down enable line of the counter 713 and gate 723 feeds the count down enable thereof. The clock of the counter 709 is controlled by the "or" signal of suitably buffered terminals 17 and 19. The clock signal of counter 713 is fed by the "or" signal of suitably buffered terminals 33 and 35. The reset line of counter 709 is controlled by the combination of signals from gates 360, 395 and 315, as shown. The reset line of counter 713 is controlled by the combination of signals from gates 360, 395 and 315, as shown.

Combinational and sequential logic circuits 711 and 715 provide outputs at various counts of the counters 709 and 713, respectively, plus latching circuitry so that the conjunctive use of the counters 709 and 713 with associated respective circuits 711 and 715 provide functionally the same "same" and "closed" signals provided by the program motors 621 and 635 and their respective vane switches. In addition, the three multi-position switches 733, 735 and 737 permit the user to select three settings for the counts at which signals are supplied to terminals 11, 58, 62, and 66, respectively. Similarly, the three multi-position switches 739, 741 and 743 provide three settings for the signals supplied to terminals 27, 72, 76 and 80, respectively. While the particular settings will vary for the speed at which the compressor changes capacity, typical settings for a machine which can reach maximum capacity in 30 seconds might be a range of 4, 5, and 6 seconds on terminal 11; 5, 6 and 7 seconds on terminal 58, and 6, 7, and 8 seconds on terminals 62 and 66, with a constant setting of perhaps 27 seconds on terminal 68. Similar settings would be used on terminals 27, 72, 76 and 80, and 82.

Attention is further directed to a first control latch 370 and a second control latch 372, which are conventional latches with the set line of the first latch 370 being controlled by a suitably buffered and converted signal from terminal 5, and the clear line thereof is controlled by a suitably buffered and converted signal from terminal 19. Similarly buffered and converted signals from terminals 21 and 35 control the set and clear lines, respectively, of second control latch 372. Also, solid state triggers 725, 727, 729, 731 and 745 (FIG. 4a) are as previously described for the triggers 705 and 707 (FIG. 4d). Also shown in FIG. 4d are first delay line 747, second delay line 749, third delay line 751 and fourth delay line 753. Each of these delay lines typically provides a time delay on the order of seventy seconds, to permit temporary compressor failures to occur, as on startup, without signalling a system failure. The remaining logic gates are shown in conventional symbology and may be implemented with any positive logic technology.

FIG. 5 illustrates another alternative embodiment of the multiple compressor control device shown in FIGS. 1-4, employing a microprocessor such as the Fairchild F8 for sequencing and decision-making. The system inputs are as described for the embodiment shown in FIGS. 3a-3d; however, the 110 V signals must be converted to logic signals compatible with the microprocessor and associated circuitry. More specifically, a signal on line 754 indicates that the first compressor, C1 (not shown), is ready to load. A signal on line 755 indicates that the second compressor, C2 (not shown), is ready to load. A signal on line 756 indicates from the room thermostat, time clock, switch, or other suitable means, that increased cooling is required. A signal on line 757 indicates that decreased cooling is required. Signals on lines 748 and 759 indicate water (or other coolant) flow in compressor C1 and C2, respectively.

A signal on line 760a determines the "lead" and "lag" compressor for the next operational cycle. As before, a manually operated switch 760b can override the incoming signal. External load commands for the compressors C1 and C2 are indicated on lines 761a and 762a, respectively, with the commands typically being provided by manually actuated switches 761b and 762b, respectively, or the like. Similarly, external commands to unload the compressors C1 and C2 are indicated on lines 763a and 764a, respectively, from switches 763b and 764b, respectively, or the like.

Each of these eleven input signals is then operated on by level shifters 765a–k to be made compatible with the logic levels of the microprocessor 766, to which they each supply a signal. Each level shifter also supplies a signal to a conventional failure detector circuit 767a, which activates an indicator 767b of any conventional type upon detection of a failure.

Also supplying inputs to the microprocessor 766 is a chiller failure reset switch 768, and switches 769a–b for manually starting the compressors C1 and C2, respectively. A system reset switch 770 also provides a signal to the microprocessor, as does a mode selector (automatic or manual) switch 771. A lag compressor lockout switch 772 and an anti-recycle switch 773 also provide control siganls to the microprocessor.

Other inputs to the microprocessor 766 are provided by a plurality of switches 774a–f. The switch 774a set into the microprocessor a percentage capacity to which each compressor will be increased on start-up as a minimum operating capacity, for example 32%±5%. The switch 774b selects the stabilization time ("off" cycle of the timer 200 described in FIG. 2) of the system, typically in the range of zero to nine minutes. The switches 774c and 774d are used to set into the microprocessor the exact time required for the compressors C1 and C2, respectively, to go from zero percent capacity to 100% capaciry. That is, the time for the vane angles to increase, in a free-running mode, from zero to 100% is measured and the time is set into the machine at switches 774c and 774d. Typically, less than one hundred seconds is required for maximum vane change.

Once the vane change times are set, programming the microprocessor for the incremental changes hereinafter described for loading and unloading is straightforward. Using the high frequency internal clock of the microprocessor as a time base, the vane change time can be divided into any suitable increments, with the result that any desired incremental changes in capacity can be programmed. Incremental increases and decreases in capacity are provided by counting the pulses of the microprocessor timebase until the desired incremental change is achieved.

The remaining switch inputs are similar. The antirecycle switch 774e sets into the microprocessor a period of time during the compressor will not restart if shutdown has occurred due to low demand for chilling. The recycle switch 774e thus serves a function similar to the low temperature shutdown switch 41 of FIGS. 3a–3d. The coolant flow failure switch 774f sets into the microprocessor a selected time in which the compressor must start, after a start signal has been received, before a failure condition will be signaled.

Referring again to the use of the microprocessor's internal clock as a timebase, it should be recognized that the counting and registering capacities of the microprocessor permit internal setting of the capacities at which lag compressor start, lag compressor shutdown, maximum operating capacity, and system shutdown occur. If adjustment of any of these capacities is desired, additional input switches, similar to the minimum vane setting switch 774a, may readily be provided, or the program of the microprocessor may be changed. It is believed that the microprocessor program necessary to achieve these functions with the given inputs will be apparent to one skilled in the art, given the teachings herein.

The last remaining input to the microprocessor 766 is provided by an external memory 775, which stores information in the event of a system or compressor failure, as indicated by the microprocessor. Thus, the memory 775 will signal the microprocessor 766 not to attempt to start a failed compressor in accordance with the guidelines discussed in connection with FIGS. 1–4, above. Since the memory is generally required to retain information when the system shuts down, and to provide that information on next attempted start-up, an independent power supply (not shown) should be provided if a volatile memory is used.

Once the microprocessor 766 has interpreted the inputs, it signals, through buffer relays or the like, each compressor, or causes a failure signal to be detected at the failure detect circuit 767a. Indicators corresponding to each buffer relay may also be activated, as well as general system indicators. Thus, a command to load the compressor C1 activates a buffer relay and associated indicator 776. A general system indicator 777a, indicating that the system in general is operational, a pair of indicators 778a–b, indicating that the compressor C1 is operational and under automatic control, may also be provided. Also a general system indicator 777b, indicating that an increase in cooling capacity is required, may also be provided. Each of the above indicators is preferably controlled by the microprocessor, although different combinations of input signals may be required to activate a given indicator.

Once the buffer relay 776 has been signaled, either a failure signal is provided to the failure detection circuit 767a, or a load signal is provided to the compressor C1. Likewise, the microprocessor may signal a buffer relay and indicator 779 to require the compressor C1 to be unloaded or that a failure signal be generated. Similarly, the second compressor C2 may be loaded or unloaded via signals to buffer relays and indicators 780 and 781, respectively, and the automatic operation of the compressor C2 may be indicated on indicators 782a–b. Of course, C1 start relay 783 will have been activated at the initial loading of the first compressor, while the C2 start relay 784 will have been activated at the initial loading of the second compressor. A failure of either compressor on startup will activate an indicator 785a or 785b, respectively, and will also signal buffer relays 786a or 785b, respectively, and will also signal buffer relays 786a and 786b, respectively, to provide a remote failure indication.

If either or both compressors C1 and C2 are operating, their percentage loads may be indicated by means of load displays 787 and 788. Other system indicators which may be provided include a system balance indicator 790, a system load decrease indicator 791, and a recycle indicator 792, each activated by appropriate inputs to the microprocessor. The microprocessor 766 also controls an auxiliary start relay 793, and can control power to the thermostat through a buffer relay 794. It should be noted that the output buffer relays described herein perform a level conversion, since the inputs thereto from the microprocessor are digital logic signals, while the signals provided to the compressors themselves are conventional line current.

It can thus be seen that the invention described herein may be embodied in an electromechanical system using relays and the like, or a "dedicated" digital system, or a microprocessor system. For the systems thus far described, the present invention has been discussed in connection with a plurality of compressors. However, the invention is readily adaptable to single compressor systems.

Referring now to FIGS. 6a and 6b, there is shown therein circuitry adapted for implementing the present invention for use with a single variable capacity refrigeration compressor. Similar to the multiple compressor embodiments described above, power is applied to terminal 800 from an external control source such as an air thermostat, time clock, switch or the like; this in turn applies power to a switch 802. The switch 802 is preferably a three position switch, having an "off" position, a momentary "manual start" position, and an "automatic start" position. For most applications, the "automatic start" position will have been pre-selected.

Assuming the switch 802 (and therefore also switches 803, FIG. 6d) is in the automatic position, power is then applied to a thermostat (not shown) of the cooling system at terminal 804 through normally closed contacts 803 associated with a panel failure timer 842 and normally closed contacts 805 associated with an anti-recycle timer 936. At the same time, power is applied to a stabilization timer 806 through a normally closed pair of contacts 808 associated with "on cycle" timer 810. Both the stabilization timer 806 and the "on cycle" timer 810 are adjustable timers of the sort described previously, with the timer 806 having a 5–9 minute cycle, and the timer 810 having an "on" cycle of approximately twenty seconds. Also, a safety relay 812 energizes and closes a normally open pair of contacts 814 associated therewith and connected between the terminal 800 and the relay 812.

When the stabilization timer 806 times out, normally open contacts 824 associated therewith close, and cause the "on cycle" timer 810 to start timing. While the "on cycle" timer 810 is timing, the system is responsive to demands for increased or decreased chilling from the thermostat. If the thermostat indicates that cooling is required, power is applied to a terminal 816. This energizes a thermostat load relay 818 and also activates an increase capacity indicator 820 such as a light or other suitable means displayed on a user-visible panel (not shown). When the thermostat load relay 818 energizes, a circuit is completed to a load relay 822 through normally open contacts 824 associated with the timer 806, normally closed contacts 825 associated with a panel failure relay 972, normally open contacts 826 associated with the relay 818, normally closed contacts 828 associated with a vane increment relay 830, and finally through normally closed contacts 832 associated with a maximum vane relay 834 (FIG. 6b). When the load relay 822 energizes, a circuit is completed to a compressor start relay 836 through normally open (but now closed) contacts 838 associated with the load relay 822, and normally closed contacts 844 associated with a low load recycle relay 846.

When the compressor start relay 836 energizes, contacts 848 associated therewith close, and a circuit is completed between terminals 850 and 852. Terminal 850 is connected to the internal controls of the compressor, and a signal from the compressor (not shown) is provided thereat when the start circuit internal to the compressor is ready for use. Terminal 852 is connected to the compressor start circuit; thus a completed circuit between terminals 850 and 852 causes the compressor to start. This causes an indicator 845 and an elapsed time indicator 847 to be activated. Also, normally open contacts 849 associated with compressor start relay 836 close and complete a circuit between terminals 851 and 853, causing the system pump to start.

Once the compressor starts, the internal controls of the compressor signal (if no failure occurs) that the machine is capable of loading, or increasing capacity. This signal is received at a terminal 854, which causes a control relay 894 to energize, there being a neutral at terminal 855. This causes a signal to be applied to a terminal 856, through normally open contacts 857 associated with the relay 855, normally closed contacts 858 of a deenergized minimum vane relay 860 and normally open contacts 859 of the compressor start relay 836. Also, when the control relay 894 energizes, contacts 894a associated therewith extinguish an indicator 894b, which had indicated that the chiller was self-operating; i.e.—not controlled by the panel if operating at all. An indicator 841a is also caused to activate when a signal is applied to the terminal 854, and another indicator 841b is activated when a signal is applied to terminal 856. The terminal 856 is connected to the vane angle increase control of the compressor, and the signal from the terminal 854 therefore causes the vane angle, and capacity, of the compressor to increase a set amount from a starting position of zero capacity.

The amount of increase in capacity is controlled by a load programmer 900 and associated circuitry, which is actuated when the vane angle control of the compressor is actuated. The load programmer 900 comprises a load programmer coil 901, an unload programmer coil 902, and a plurality of contacts, exemplary ones of which are shown in FIG. 6b. The load programmer 900 is preferably a multiposition relay or solenoid-actuated switch. For example, the programmer may have twenty-six contact points designed to represent the entire range of compressor capacity. Thus, each contact of the programmer represents a four percent incremental increase in the capacity of the compressor, with the first contact representing a zero percent capacity and the last contact representing 100% capacity. Obviously, the number of contacts chosen is to a large extent arbitrary, although greater numbers of contacts will generally result in improved accuracy. The present choice of twenty-six contacts, or twenty-five increments, has been chosen to provide good accuracy without undue cycling in an electro-mechanical embodiment. However, as has already been described, microprocessor embodiments of the invention preferably uses two percent increments. By energizing the load programmer coil 901, the programmer 900 is caused to select contacts representative of an increase in compressor capacity. Similarly, selection of contacts representing a decrease in capacity is caused by energizing the unload programmer coil 902.

To be useful, the time for the programmer to move from one contact point to the next must closely approximate the time for the actual vane angle to change by the increment represented by the programmer. This is accomplished in the following manner. When the increase load signal (such as that applied to the terminal 856) is generated, a circuit is completed to energize a programmer timer 903. The programmer timer is adjustable for a range of up to 15 seconds. When the timer 903 times out, normally open contacts 904 associated therewith close. This energizes a programmer release timer 905, of the same type as the timer 903, and permits either the load programmer coil 901 or the unload programmer coil 902 to energize, thereby incrementing or decrementing the load programmer 900. By adjusting the programmer timer 903, the programmer 900 can be timed to increment at the same rate at which the vane angle of the compressor changes.

When the compressor is initially started, for example each morning, the vane angle is typically set for the minimum capacity, for example zero percent. Upon receipt of the first increase capacity signal, the capacity is increased to an arbitrary minimum start level, for example 32%. Since a 32% capacity is substantially greater than a one step increase four percent for this example) and, as will be explained in greater detail hereinafter, the programmer 900 is generally permitted to increase (or decrease) by only a single step for each on cycle of the "on cycle" timer 810, special circuitry must be provided to permit the programmer, as well as the compressor itself, to increase capacity to the minimum starting level within a single cycle.

The increase to the minimum starting capacity is accomplished in the following manner. When the initial signal to increase capacity is generated, the control relay 894 energizes and closes the contacts 906 associated therewith. The closing of the contacts 906 permits the programmer timer 903 to energize, or start timing, at the same time that the compressor vane angle begins to increase, by means of a current path through normally closed contacts 907 associated with the programmer release timer 905, the contacts 906, and normally closed contacts 908 associated with a supplemental minimum vane relay 865. Thus, while the programmer timer 903 is timing, the vane angle on the compressor is being commensurately increased by a signal from terminal 854 to terminal 856.

When the programmer timer 903 times out, contacts 904 associated therewith close, thereby energizing the programmer release timer 905 and also energizing the programmer load coil 901 through normally closed contacts 869 associated with an unload relay 874, and contacts 909 associated with the supplemental minimum vane relay 865. Only a momentary pulse is required to shift the programmer by one step; thus the programmer release timer 905 is set to time out quickly, for example, after 1/10th second. When the programmer release timer 905 times out, the contacts 907 associated therewith open and reset the programmer timer 903. This in turn opens the contacts 904 associated with the timer 903, which breaks the current path to the programmer load coil 901 (resulting in an increase of only one step) and also resets the release timer 905.

However, since the compressor vane angle has not yet reached the minimum starting position, the current path to the programmer timer 903 still exists due to the contacts 908 associated with the minimum vane relay 860; this causes the timer 903 to begin timing as before. Likewise, the contacts 858 continue to permit the vane angle on the compressor to increase by the signal at terminal 856. The programmer 900 thus continues to indicate incremental increases in capacity, and the compressor vane angle continues to increase until the minimum vane relay 860 energizes. This occurs when the programmer 900 completes a circuit between terminals "A" and "B" (shown on both FIGS. 6a and 6b). When the programmer 900 reaches the step 910 which has been pre-selected at the minimum vane position for start up (32% capacity, or the ninth step, for the present example), the signal at terminal "A" is transmitted through the contacts 910 to energize the latch relay 862, which through its contacts 861 causes the minimum vane relay 860 to energize. In turn, normally open contacts 863 associated therewith are caused to close, thereby energizing a supplemental minimum relay 865. This causes the minimum vane contacts 858 and the supplemental minimum vane contacts 908 to open, thereby breaking the current paths to both the programmer timer 903 and the terminal 856. Thus, both the programmer 900 and the vanes of the compressor stop increasing once the minimum vane position is reached.

Also, once the minimum vane relay 860 energizes, both it and the supplemental minimum vane relay 865 are locked into the energized start by means of minimum vane contacts 864 and contacts 866 associated with the compressor start relay 836. As will be apparent hereinafter, the minimum vane relay 860 will therefore remain energized until the compressor start relay 836 deenergizes. This occurs only upon a system failure, or on normal shut down, both of which are more completely described hereinafter.

If, after the vane angle has been increased to the minimum position as described above, the thermostat still indicates a need for increased cooling, a signal is provided at the terminal 816, and the above process is in major portion repeated. That is, power is applied to the terminal 816 to energize the thermostat load relay 818 when "on cycle" timer 810 is timing. Again, the load relay 822 energizes. Since the compressor start relay 836 has remained energized from the initial loading cycle, the compressor and pump have both started. By completing the circuit between terminals 854 and 856, which is accomplished through normally open contacts 868 associated with the now-energized load relay 822, an increase signal is applied to the vane angle control of the compressor. However, the vane angle is permitted to increase by only one increment of the programmer, or four percent, because of the programmer timer 902.

When the load relay 822 energizes, contacts 910 associated therewith cause the programmer timer 903 to start timing. When the programmer timer 903 times out, the contacts 904 associated therewith cause the load programmer coil 901 to energize through normally open contacts 911 associated with the load relay 822. The closing of the contacts 904 also starts the programmer release timer 905 timing. However, when programmer timer 903 times out, another normally open contact associated therewith closes, and energizes the vane increment relay 830.

Energizing of the relay 830 causes the contacts 828 associated therewith to open, thereby deenergizing the load relay 822. When the load relay 822 deenergizes, contacts 910 open and reset the programmer timer 903. This in turn opens the contacts 904, which resets the programmer release timer 906. Because of the time setting on the release timer 905, and the inherent speed at which such contacts open or deenergize, the programmer release timer will be reset well before it times out. Thus the programmer will increment only one step. Likewise, when the load relay 822 deenergizes, its contacts 868 open and remove the signal from the terminal 856. Thus both the programmer 900 and the compressor vanes undergo one incremental increase. It should be noted that the vane increment relay 830, once energized, is locked into the energized state via its own contacts 913 until "on cycle" timer 810 is reset. This prevents cycling when the programmer timer 903 is reset. If additional increases in capacity are required, the above process is repeated until the termostat connected to terminal 816 indicates that no increase is required.

Presuming that the system has been designed with sufficient capacity to adequately chill the allotted space, the thermostat will eventually indicate that no further increase in capacity is required. Likewise, no decrease in capacity will be required. In such a case, the system will be in balance, and an indicator 914 will be activated, by a current path through normally closed contaxts 915 associated with the load timer 818, and normally closed contacts 916 associated with unload timer 872.

At some point, as toward evening, the thermostat will indicate during the "on" cycle, at terminal 870, that a decrease in capacity is required. This causes the thermostat unload relay 872 to energize, and also lights an unload indicator 874. When the thermostat unload relay 872 energizes, a circuit is completed to unload relay 874 through normally open contacts 876 associated with the relay 872, normally closed contacts 878 associated with the relay 830, normally open contacts 873 associated with the supplemental minimum vane relay 865, normally open contacts 880 associated with the compressor start relay 836, and normally open contacts 882 associated with the zero percent capacity position of the programmer 900, shown in FIG. 6b. Once the unload relay 874 energizes, normally open contacts 890 associated therewith close and, through normally open contacts 892 associated with the control relay 894 a circuit is completed between terminals 854 and 896, thereby signaling the compressor to decrease capacity by decreasing vane angle. An indicator 897 is also activated. Again, the programmer timer 903 and vane increment relay 830 combine to cause a decrease of only one increment.

More specifically, when the unload timer energizes, contacts 917 associated therewith close and cause the programmer timer 903 to start timing as an unload signal is applied to terminal 896. When the programmer timer 903 times out, contacts 904 close and a signal is applied to the unload programmer coil 902 through normally open contacts 918 associated with the unload relay 902. This signal causes the programmer 900 to decrement; however, the decrement is limited to one step by a sequence similar to loading. When the programmer timer 903 times out, the contacts 912 close and energize the vane increment relay 830, which then locks itself in via contacts 913.

The energizing of the relay 830 opens the contacts 878, which deenergizes the unload relay 874. This in turn opens contacts 917, thereby resetting the programmer timer 903. This causes the programmer release timer 905 to be reset before it times out, resulting in only a single, incremental decrease both in the compressor vane angle, and in the programmer 900.

The capacity of the compressor will increase or decrease as demanded by the thermostat in accordance with the above sequences. As demand for chilling decreases, capacity will be correspondingly reduced. At some point, the capacity of the compressor will be reduced to an arbitrarily low value, preferably less than the minimum vane opening; for example, a 20% vane opening may be used. When capacity has been so reduced. a latch relay 930 (FIG. 6b) energizes and causes normally open contacts 932 (FIG. 6a) associated therewith to close. (It should be noted that the latch relay 862 was released when the programmer decremented below the minimum starting capacity, at step 931.) This completes a current path from the terminal 800 to a low load recycle relay 846, through normally closed contacts 803 associated with the failure timer 842 and normally closed contacts 805 associated with an antirecycle timer 936, as well as normally open contacts 938 associated with the minimum vane relay 860, and a normally closed lock-out siwtch 939. This completed path causes the low load recycle relay 846 to energize, lights a low load indicator 940, and starts the timing of the anti-recycle timer 936. The recycle relay 846 locks itself in by means of normally open contacts 942 which shunt the contacts 938 and 932. It should be recognized that the low load recycle relay 846 and associating timing circuitry perform a function similar to low temperature shutdown switch 41 of FIGS. 3a–3d, although recycle relay 846 also performs additional functions.

When the recycle relay 846 energizes, normally closed contacts 844 associated therewith open, causing the compressor start relay 836 to deenergize. This shuts off both the compressor and the system pump, through loss of a signal at terminals 852 and 853. Thus the system shuts down chilling in response to lost demand. The compressor is then caused to unload to zero capacity by means of normally closed contacts 919 associated with the relay 836, which keeps an unload signal on both the programmer 900 and the terminal 896 (from the terminal 920 and contacts 921 associated with the control relay 849) until the zero capacity contacts 886 on the programmer 900 break the circuit to the unload relay 874.

The system is permitted to again sense demand, via the thermostat, once the anti-recycle timer 936 has timed out. The anti-recycle timer 936 preferably has a timing cycle which may be varied between 0 and 60 minutes, to permit stabilization of the temperature in the space being chilled. When the anti-recycle timer times out, contacts 805 associated therewith open, and break the current path to recycle relay 846. When the recycle relay 846 deenergizes, the system is restored to the "start" status described above, and is permitted to sence the thermostat in the manner there described. Recycling in this manner can be prevented merely by opening the recycle lockout switch 939.

As with the multiple compressor control device described previously, various fault detection circuits and safety defices have been built into the single compressor control device shown in FIGS. 6a–b. One such circuit is the panel failure timer 842, which is preferably an adjustable timer with up to a 60 minute cycle. Whenever either the load relay 822 or the unload relay 874 energize, the panel failure timer 842 is started timing through either the thermostat load relay 818 or the thermostat unload relay 872. As previously noted, the thermostat load relay 818 energizes in response to the thermostat's demand for chilling at the terminal 816, which causes normally open contacts 940 associated therewith to close.

If the compressor start relay 836 is not yet energized, the panel failure timer 842 may be started timing through normally closed contacts 954 associated with compressor start relay 836 and normally closed contacts 952, associated with the compressor start relay 836. If the start relay 836 is energized, the panel failure timer 842 is started timing through the contacts 950, normally closed contacts 956 associated with the load relay 822, and normally closed contacts 958 associated with the unload relay 874. If an unload signal is received at the terminal 870 from the thermostat, the thermostat unload relay 872 is energized. In turn, normally open contacts 960 associated therewith and connected in parallel with the contacts 950, close to start the panel failure timer 842 timing. Normally closed contacts 955 associated with the minimum vane relay 860 ensure that the compressor start relay 836 also energizes properly.

Once the panel failure timer 842 starts timing, either load relay 822 or unload relay 874 must energize before the panel failure timer 842 times out, or the compressor will be prevented from increasing in load capacity; this of course only occurs in the event of a panel failure. On initial startup, the compressor start relay 836 must also energize to open contacts 952. In normal operation, the timer 842 is reset either when the load relay 822 energizes and opens contacts 956, or when the unload relay 874 energizes and opens contacts 958.

In the event neither load relay 822 nor unload relay 874 resets panel failure timer 842 before it times out, normally open contacts 970 associated with the timer 842 close and energize a panel failure relay 972 and failure indicators 974. Likewise, normally closed contacts 976 associated with the timer 842 open, and shut off a "system operational" indicator 978, as well as an indicator 979, which is extinguished by the opening of panel failure relay contacts 922. When the panel failure relay energizes, contacts 980 associated therewith close and lock in the panel failure timer 842. This causes the contacts 840 to open and deenergize the compressor start relay 836, which prevents increasing the vane angle of the compressor despite demands for increased capacity from the thermostat because of control relay contacts 857.

Although the compressor is prevented from increasing capacity once the panel failure relay has energized, the compressor is permitted to continue running at the same capacity by means of panel failure relay contacts 982 (connected between terminals 850 and 852) and 984 (connected between terminals 851 and 853). The compressor is permitted to decrease capacity through the internal controls of the compressor, which override the control device when the panel failure relay 972 is energized. For safety purposes, the internal controls of the compressor always override signals from the control device, although the programmer 900 will continue to reflect the commands of the control device.

Momentary contact switches 990 and 992 are provided to manually energize the load relay 822 and the unload relay 874, respectively, thereby overriding the automatic controls of the system when the start switch 802 is used in the manual mode. It should be noted that, in the event of a system failure, the system shuts down without unloading the programmer 900. Thus the load capacity at time of failure is available as a diagnostic aid. Also, as an operational aid, indicators 988 may be provided to indicate operating load capacity.

Figure 4B:
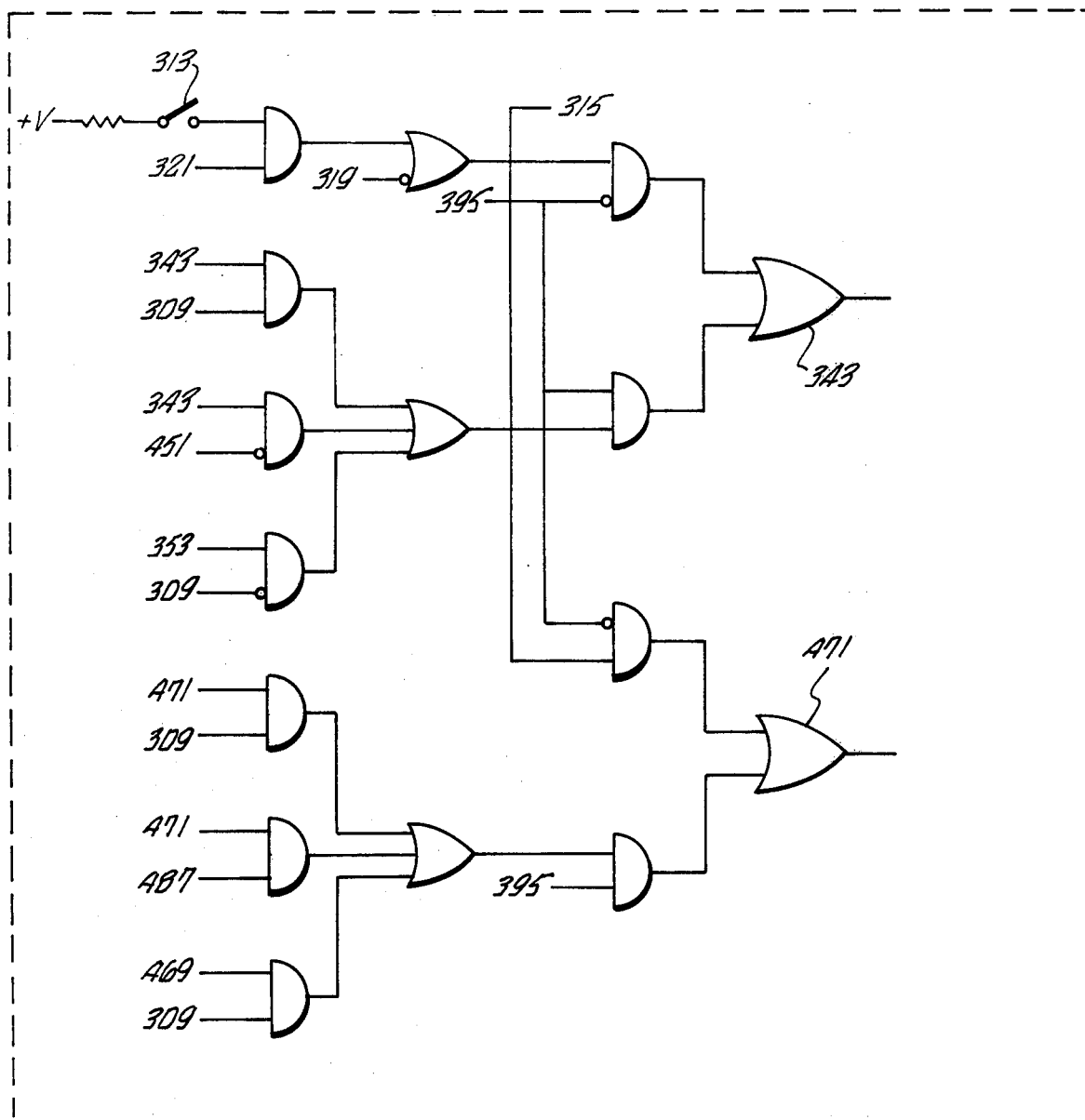

Although the above detailed description of a single compressor control device embodying the present invention has dealth substantially with an electromechanical system, it is to be understood that this system may readily be embodied in solid state systems such as shown for the double compressor systems in FIGS. 4a–4b and FIG. 5.

Having fully described the invention it is to be understood that it is not to be limited to the details herein set forth, but that the invention is of the full scope of the appended claims.

What is claimed is:

1. A refrigeration system control device for use with two variable capacity compressors comprising,
   a first timing means for generating a cyclic on and off signal,
   a first load and unload means adapted for connection to temperature sensing means for automatically generating a signal for varying by a predetermined increment the capacity of the first of said compressors in response to a signal from said temperature sensing means during the on signal of said first timing means, means for generating a second timing signal in response to said signal from said first load and unload means, said second timing signal means having first and second states,
   a second load and unload means adapted for connection to said temperature sensing means for automatically generating a signal for varying by a predetermined increment the capacity of the second of said compressors in response to a signal from said temperature sensing means during the on signal of said first timing means, means for generating a third timing signal in response to said signal from said second load and unload means, said third timing signal means having first and second states, and
   a first transfer means for automatically activating either said first load and unload means or said second load and unload means during the on signal of said first timing means in response to said second and third timing signals, wherein said first load and unload means is activated when said third timing signal means is in a first predetermined state and said second load and unload means is activated when said second timing signal means is in a first predetermined state.

2. A device as in claim 1 further comprising,
   a fourth timing signal means activated by said first load and unload means, said fourth timing signal means having first and second states,
   a fifth timing signal means activated by said second load and unload means, said fifth timing signal means having first and second states, and
   a second transfer means for automatically activating either said first load and unload means or said second load and unload means during the on signal of said first timing means in response to signals generated by said fourth and fifth timing signal means, wherein said first load and unload means is activated when said fifth timing means is in a first predetermined state and said second load and unload means is activated when said fourth timing means is in a first predetermined state.

3. A device as in claim 2 wherein
   said second timing signal means is activated only when said first load and unload means generates a signal for increasing the capacity of said first compressor, and
   said third timing signal means is activated only when said second load and unload means generates a signal for increasing the capacity of said second compressor.

4. A device as in claim 3 wherein
   said fourth timing signal means is activated only when said first load and unload means generates a signal for decreasing the capacity of said first compressor, and
   said fifth timing signal means is activated only when said second load and unload means generates a signal for decreasing the capacity of said second compressor.

5. A device as in claim 4 further including a first means for generating a system pump start signal in response to said signal generated by said first load and unload means for increasing the capacity of said first compressor, and
   a second means for generating a compressor pump start signal in response to said signal generated by said second load and unload means for increasing the capacity of said second compressor.

6. A device as in claim 5 further comprising means for generating a first compressor start signal in respnse to said signal generated by said compressor pump start means.

7. A device as in claim 6 further comprising means for sensing that said first compressor is operating at a predetermined maximum load and generating a signal therefrom, and means for generating a signal for starting said second compressor in response to said signal from said maximum load signal means.

8. A device as in claim 7 further comprising means for generating a first signal in response to said first compressor maximum load signal which causes said first load and unload means to generate a signal for decreasing the capacity of said first compressor, and
   means for generating a second signal in response to said first compressor maximum load signal which causes said second load and unload means to generate a signal for decreasing the capacity of said second compressor.

9. A device as in claim 8 further comprising first means for causing said first load and unload means to terminate said capacity-decreasing signal when the capacity of said first compressor has reached a predetermined capacity, and
   second means for causing said second load and unload means to terminate said capacity-increasing signal when said second compressor has reached a predetermined capacity.

10. The device of claim 9 further comprising sequencing means having first and second states for selecting said first compressor as a lead compressor and said second compressor as a lag compressor when said sequencing means is in said first state, and for selecting said second compressor as a lead compressor and said first compressor as a lag compressor when said sequencing means is in said second state, said lead compressor being started and loaded to maximum capacity before said lag compressor is started.

11. A device as in claim 9 further comprising
means for sensing the capacity of the first of said compressors, said sensing means comprising a program motor responsive to the signals generated by said first load and unload means for varying the capacity of the first of said compressors, and
means for sensing the capacity of the second of said compressors, said sensing means comprising a program motor responsive to said signals generated by said second load and unload means for varying the capacity of the second of said compressors.

12. A device as in claim 11 where said capacity sensing means are adapted to be additionally responsive to unload signals generated by said first and second compressors.

13. A refigeration system control device for incrementally varying the chilling capacity of at least one variable capacity compressor comprising
a first timing means for generating a cyclic on and off signal,
a second timing means matched to the time required for the capacity of said variable capacity compressor to vary by an increment, and
a first load and unload means adapted for connection to temperature sensing means for causing the capacity of said compressor to be varied by said increment set by said second timing means in response to a signal from said temperature sensing means during the on portion of the signal from said first timing means.

14. The refrigeration system control device of claim 13 wherein the magnitude of said increment is predetermined.

15. The refrigeration system control device of claim 14 wherein the range of capacities of said variable capacity compressor is divided into at least twenty-five increments.

16. The refrigeration system control device of claim 13 further including means for causing the capacity of said variable capacity compressor to be increased to a minimum starting capacity when a first signal demanding an increase in capacity is received from said temperature sensing means during the on portion of the signal from said first timing means.

17. The refrigeration system control device of claim 13 further comprising
means for preventing said first load and unload means from responding to signals from said temperature sensing means indicating a need for increased chilling capacity for a predetermined period of time after said chilling capacity of said variable capacity compressor has been reduced to a predetermined low level, even though said signals from said temperature sensing means are present during the on portion of the signal from said first timing means.

18. The refrigeration system control device of claim 13 further comprising
failure detection means for detecting failures in said control device or said compressor and for preventing said load and unload means from attempting to increase the capacity of said compressor if a failure is detected.

19. The refrigeration system control device of claim 13 wherein said control device incrementally varies the chilling capacity of first and second variable capacity compressors.

20. The refrigeration system control device of claim 19 further comprising a third timing means matched to the time required for the capacity of said second variable capacity compressor to vary by an increment,
second load and unload means adapted for connection to said temperature sensing means for causing the capacity of said second compressor to be varied by said increment set by said third timing means in response to a signal from said temperature sensing means during the on portion of the signal from said first timing means, and
transfer means for selecting either said first load and unload means of said second load and unload means during the on portion of the signal from said first timing means.

21. The refrigeration system control device of claim 20 wherein said transfer means causes said variations in capacity to be alternated between said first compressor and said second compressor.

22. The device of claim 21 wherein the magnitude of said increment is predetermined.

23. A refrigeration system control device for controlling two variable capacity compressors comprising
first timing means for generating a cyclic on and off signal,
first load and unload means adapted for connection to temperature sensing means for automatically generating a signal for varying by an increment the capacity of the first of said compressors in response to a signal from said temperature sensing means during the on portion of the signal from said first timing means,
second load and unload means adapted for connection to said temperature sensing means for automatically generating a signal for varying by an increment the capacity of the second of said compressors in response to a signal from said temperature sensing means during the on portion of the signal from said first timing means, and
transfer means for automatically activating either said first load and unload means or said second load and unload means during the on portion of the signal from said first timing means.

24. The refrigeration system control device of claim 23 further comprising
programmer timing means adapted to match the time required for the capacity of said first compressor to vary by said increment, and also adapted to match the time required for the capacity of said second compressor to vary by said increment, said second timing means providing a signal to said first and second load and unload means to cause said first and second load and unload means to vary the capacities of said first and second compressors, respectively, by said increment.

25. The refrigeration system control device of claim 23 wherein said programmer timing means comprises second and third timing circuits, said second timing circuit being adapted for use with said first compressor, and said third timing circuit being adapted for use with said second compressor.

26. The control device of claim 25 wherein the magnitude of said increment is predetermined.

27. The refrigeration system control device of claim 24 further including
means for causing the capacity of each of said variable capacity compressors to be increased to a minimum starting capacity when the respective load and unload means receives a first signal for an increase in capacity from said temperature sensing means during the on portion of the signal from said first timing means.

28. The refrigeration system control device of claim 23 wherein said transfer means causes said first compressor to receive all load and unload signals until the capacity of said first compressor is increased to a predetermined maximum.

29. The refrigeration system control device of claim 28 wherein said transfer means responds to said first compressor reaching said predetermined maximum capacity by causing the capacity of said first compressor to be reduced to a predetermined level and the capacity of said second compressor to be increased to a minimum starting level.

30. The refrigeration system control device of claim 23 further including
   means for preventing said first and second load and unload means from responding to the signal from said temperature sensing means indicating a need for increased chilling capacity for a predetermined period of time after the capacities of both of said compressors has been reduced to a predetermined low level, even though said signal from said temperature sensing means is present during the on portion of the signal from said first timing means.

31. The refrigeration system control device of claim 29 wherein said second compressor is caused to cease chilling if the chilling capacity thereof is reduced below a minimum operating level.

32. The refrigeration system control device of claim 23 further including
   failure detection means for detecting failures in said control device or said compressor and for preventing the capacities of either of said compressors from being increased if a failure is detected.

33. A refrigeration system control device for use with variable capacity compressors wherein a first timing means, having a total timing sequence substantially identical with the time for said compressor to change capacity from a minimum setting to a maximum setting but mechanically independent therefrom, generates a predetermined number of timing signals representative of the actual capacity of said compressors.

34. A device as in claim 33 wherein said first timing means is a program motor and vane switches.

35. A device as in claim 33 wherein said first timing means is a counter.

36. A multiple compressor refrigeration system control device having
   first sensing means for detecting a failure of one of said compressors and generating a signal thereupon,
   first lockout means for disconnecting power from said failed compressor in response to a signal from said first sensing means, and
   second lockout means for preventing said remaining compressors from restarting following a system shutdown in response to a signal from said first lockout means.

* * * * *